US012720309B2

(12) United States Patent
Bhaskar et al.

(10) Patent No.: US 12,720,309 B2
(45) Date of Patent: Aug. 25, 2026

(54) MANAGING CELL SITES IN A RADIO ACCESS NETWORK

(71) Applicant: Rakuten Symphony, Inc., Tokyo (JP)

(72) Inventors: Prashanth Bhaskar, Bangalore (IN); Lokesh Chimbili, Bangalore (IN); Prasad Hiremath, Bangalore (IN); Nirav Salot, Bangalore (IN); Sanil Puthiyandyil, Tewksbury, MA (US); Mahesh Sivapuram, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 532 days.

(21) Appl. No.: 17/923,994

(22) PCT Filed: Oct. 3, 2022

(86) PCT No.: PCT/US2022/077457
§ 371 (c)(1),
(2) Date: Nov. 8, 2022

(87) PCT Pub. No.: WO2024/076358
PCT Pub. Date: Apr. 11, 2024

(65) Prior Publication Data
US 2024/0224030 A1 Jul. 4, 2024

(51) Int. Cl.
*H04W 12/069* (2021.01)
*H04W 24/02* (2009.01)
*H04W 60/04* (2009.01)

(52) U.S. Cl.
CPC ......... *H04W 12/069* (2021.01); *H04W 24/02* (2013.01); *H04W 60/04* (2013.01)

(58) Field of Classification Search
CPC .... H04W 12/069; H04W 24/02; H04W 60/04
See application file for complete search history.

(56) References Cited

U.S. PATENT DOCUMENTS 10,638,314 B2 * 4/2020 Park ...................... H04L 9/0866
2006/0143700 A1 6/2006 Herrmann
(Continued)

FOREIGN PATENT DOCUMENTS

CN 101996074 A * 3/2011 ............... G06F 8/61
WO WO-2017121602 A1 7/2017
(Continued)

OTHER PUBLICATIONS

TS 23558v17.3.0—Architecture for enabling Edge Applications (Year: 2022).*
(Continued)

*Primary Examiner* — Jinsong Hu
*Assistant Examiner* — Justin Barry
(74) *Attorney, Agent, or Firm* — Sughrue Mion, PLLC

(57) ABSTRACT

In general, the current subject matter relates to managing cell sites in a radio access network (RAN), such as an open RAN (O-RAN). In some implementations, managing cell sites in a RAN may include transmitting a first certificate pre-installed on a cell site node from the node to a first server in a wireless communication system; after the transmission of the first certificate, receiving a second certificate at the node from the first server; transmitting the second certificate from the node to a central server; and, after the transmission of the second certificate, receiving configuration information at the node from the central server. The configuration information may indicate a configuration for the node for communication in the wireless communication system. The receipt of the configuration information may automatically cause the node to configure itself, using the configuration information, for communication in the wireless communication system.

20 Claims, 20 Drawing Sheets

(56) References Cited

U.S. PATENT DOCUMENTS

2019/0074982 A1 3/2019 Hughes
2021/0105266 A1* 4/2021 Getschmann ....... H04L 63/0876
2021/0120412 A1 4/2021 Bruner et al.
2023/0062521 A1* 3/2023 Jones .................. H04L 63/0892

FOREIGN PATENT DOCUMENTS

WO WO-2022031505 A1 * 2/2022
WO WO-2023287658 A1 * 1/2023 ............. H04L 67/34

OTHER PUBLICATIONS

Wind River Blog (Year: 2021).*
Wind River User Guide (Year: 2014).*
Stack Overflow—Docker Manifest file and provisioning software modules to Kubernetes (Year: 2020).*
"Ipfs-shipyard/js-idm-client" [retrieved on Nov. 24, 2025] <https://web.archive.org/web/20201013175902/https://github.com/ipfs-shipyard/js-idm-client> (Year: 2020).*
Verma et al., "Open Bootstrap Framework enabling trustworthy networking and services for distributed diverse ecosystems" TEC [retrieved on Nov. 23, 2025] <https://www.tec.gov.in/pdf/NWG/C126.pdf> (Year: 2019).*
International Search Report and Written Opinion for International Patent Application No. PCT/US22/77457 mailed Jan. 25, 2023.
Demerjian, et al., "DHCP Authentication Using Certificates", Security and Protection in Information Processing Systems, 2004, pp. 457-472 (16 pages).

* cited by examiner

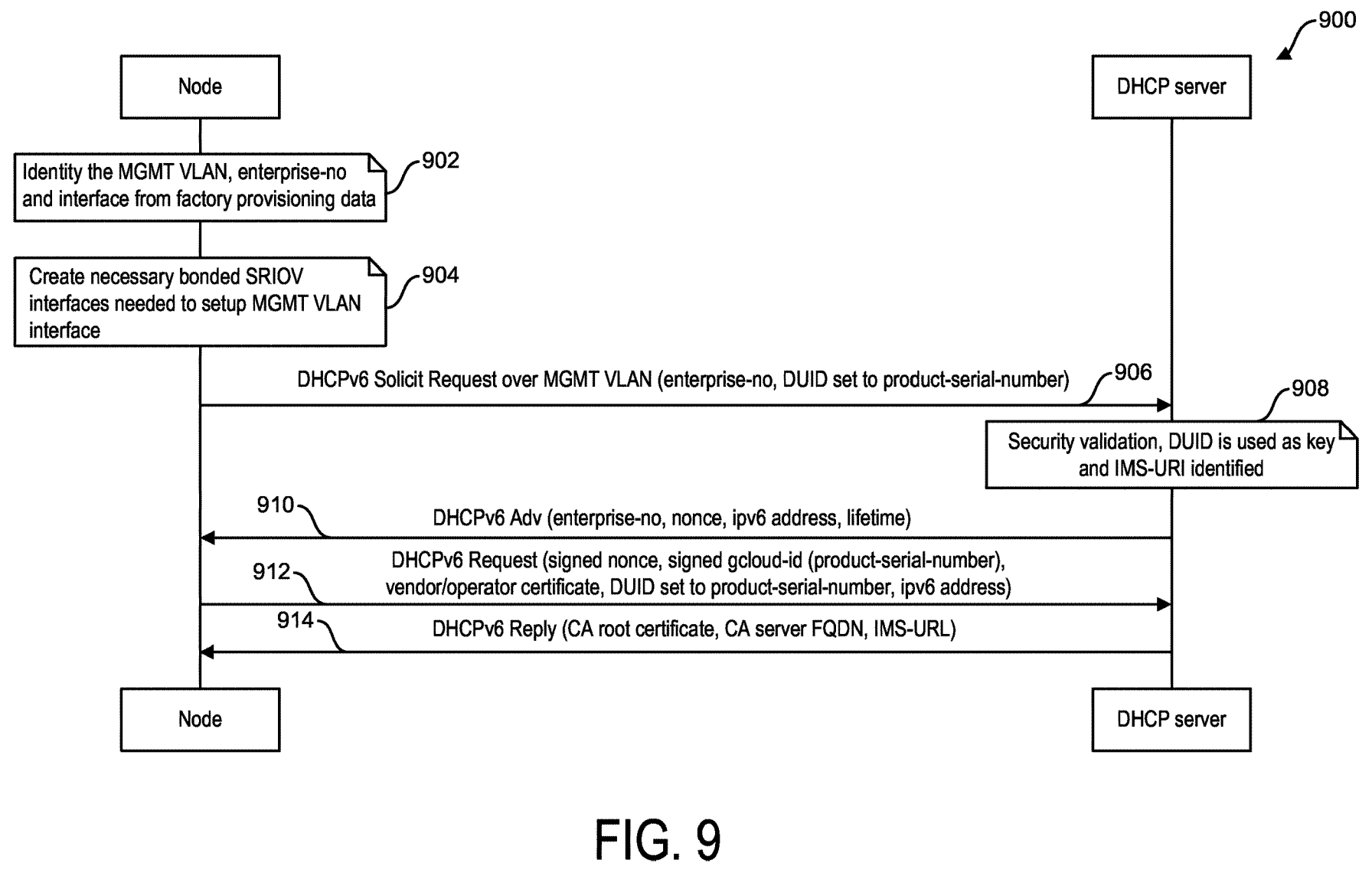

900

Node

DHCP server

902 Identify the MGMT VLAN, enterprise-no and interface from factory provisioning data 904 Create necessary bonded SRIOV interfaces needed to setup MGMT VLAN interface 906 DHCPv6 Solicit Request over MGMT VLAN (enterprise-no, DUID set to product-serial-number)

908 Security validation, DUID is used as key and IMS-URI identified

910 DHCPv6 Adv (enterprise-no, nonce, ipv6 address, lifetime)

912 DHCPv6 Request (signed nonce, signed gcloud-id (product-serial-number), vendor/operator certificate, DUID set to product-serial-number, ipv6 address)

914 DHCPv6 Reply (CA root certificate, CA server FQDN, IMS-URL)

Node

DHCP server

FIG. 9

MANAGING CELL SITES IN A RADIO ACCESS NETWORK

CROSS-REFERENCE TO RELATED APPLICATIONS

The present application claims priority to and is the 35 U.S.C. 371 United States National Phase application based on International Patent Application No. PCT/US2022/077457, filed on Oct. 3, 2022, entitled "MANAGING CELL SITES IN A RADIO ACCESS NETWORK," which is hereby incorporated by reference in its entirety.

TECHNICAL FIELD

In some implementations, the current subject matter relates to telecommunications systems, and in particular, to managing cell sites in a radio access network (RAN), such as an open RAN (O-RAN).

BACKGROUND

In today's world, cellular networks provide on-demand communications capabilities to individuals and business entities. Typically, a cellular network is a wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide improved service within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if the mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile: in rural areas, the range can be as much as 5 miles: and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. A 5G standard is currently being developed and deployed. 3GPP cellular technologies like LTE and 5G NR are evolutions of earlier generation 3GPP technologies like the GSM/EDGE and UMTS/HSPA digital cellular technologies and allows for increasing capacity and speed by using a different radio interface together with core network improvements.

Cellular networks can be divided into radio access networks and core networks. The radio access network (RAN) can include network functions that can handle radio layer communications processing. The core network can include network functions that can handle higher layer communications, e.g., internet protocol (IP), transport layer and applications layer. In some cases, the RAN functions can be split into baseband unit functions and the radio unit functions, where a radio unit connected to a baseband unit via a fronthaul network, for example, can be responsible for lower layer processing of a radio physical layer while a baseband unit can be responsible for the higher layer radio protocols, e.g., MAC, RLC, etc.

Various devices physically located at a cell site need to be configured to start communicating on the cellular network. Configuring a device physically located at the cell site may ensure that the device is authorized to communicate on the cellular network and thus may prevent unauthorized devices from communicating on the cellular network. Unauthorized devices communicating on the cellular network may result in one or more adverse consequences, such as interfering with authorized communications, usurping bandwidth needed for authorized communications, allowing for tampering with the cellular network, using cellular network resources without payment therefor, and/or causing additional or alternative adverse consequences.

Additionally, even after a device at a cell site has been configured initially, the device may need subsequent configuration, such as for software upgrade or for repair. Upgrading software may be particularly important for devices at a cell site so the devices at the cell site run optimally and with minimal hardware resource wastage. Since a cellular network typically has a large number of cell sites, slowdowns in communications and/or other adverse consequences caused by suboptimal software and/or hardware resource wastage can add up quickly across the network.

However, there is no personnel staffed at a cell site, so a person must travel to and manually perform initial configuration and any subsequent configuration(s), which takes time and incurs costs, especially since multiple cell sites will typically need to be visited.

SUMMARY

In some implementations, the current subject matter relates to a computer-implemented method. The method may include transmitting a first certificate pre-installed on a cell site node from the cell site node to a first server in a wireless communication system. The method may also include, after the transmission of the first certificate, receiving a second certificate at the cell site node from the first server. The method may also include transmitting the second certificate from the cell site node to a central server, and, after the transmission of the second certificate, receiving configuration information at the cell site node from the central server. The configuration information may indicate a configuration for the cell site node for communication in the wireless communication system. The receipt of the configuration information may automatically cause the cell site node to configure itself, using the configuration information, for communication in the wireless communication system.

In some implementations, the current subject matter can include one or more of the following optional features.

In some implementations, the method may also include, after the cell site node configures itself, transmitting software inventory information from the cell site node to the central server, and installing updated software on the cell site node in response to the central server determining, based on the software inventory information, that software installed on the cell site node is out of date. Further, the central server may be configured to trigger the installation of the updated software at any time after the cell site node configures itself: the cell site node may receive an installation instruction from the central server in response to the central server determining, based on the software inventory information, that software installed on the cell site node is out of date, and the installation instruction may cause the cell site node to automatically download the updated software that is installed on the cell site node; and/or the software inventory information may include a manifest listing versions of each one or more software modules required by the cell site node. Further, installing updated software on the cell site node may include downloading software for each of the one or more software modules from the central server and installing the downloaded software on the cell site node.

In some implementations, the cell site node may transmit the software inventory information from the cell site node to the central server to maintain current software inventory on the cell site node. Further, the software inventory information may include a manifest listing versions of each one or more software modules required by the cell site node: the method may also include, after the transmission of the software inventory information, receiving updated configuration information at the cell site node from the central server, the updated configuration information indicating an updated configuration for at least one software module identified in the software inventory information; and the receipt of the updated configuration information may automatically cause the cell site node to configure the at least one software module using the updated configuration information. Further, the cell site node transmitting the software inventory information may be triggered by the cell site node first registering with the central server.

In some implementations, the first server may transmit the second certificate to the cell site node after the first server validates the first certificate received from the cell site node, and the central server may transmit the configuration information to the cell site node after the central server validates the second certificate received from the cell site node.

In some implementations, the cell site node receiving the second certificate may automatically trigger the cell site node to transmit the second certificate from the cell site node to the central server.

In some implementations, an agent pre-installed on the cell site node may cause at least one of the transmission of the first certificate, the transmission of the second certificate, and the cell site node to configure itself using the configuration information.

In some implementations, the transmission of the first certificate may be triggered automatically by powering on the cell site node.

In some implementations, the central server may be configured to cause the configuration of the cell site node to be updated at any time after the cell site node configures itself.

In some implementations, the cell site node configuring itself may include the cell site node configuring itself to run cloud infrastructure locally on the cell site node.

In some implementations, the wireless communication system may include a radio access network (RAN). Further, the RAN may be an open RAN (O-RAN).

In some implementations, the cell site node may be in communication with a base station in the wireless communication system. Further, the base station may include at least one of the following: an eNodeB base station, a gNodeB base station, a wireless base station, and any combination thereof. Further, the base station may be operating in at least one of the following communications systems: a long term evolution communications system, a new radio communications system, and any combination thereof.

In some implementations, the cell site node may be a distributed unit (DU).

In some implementations, the central server may be a server of a central management system.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 9 illustrates an exemplary process for performing cell site node verification in the process for cell site node management of FIG. 8, according to some implementations of the current subject matter:

DETAILED DESCRIPTION

Figure 1A:
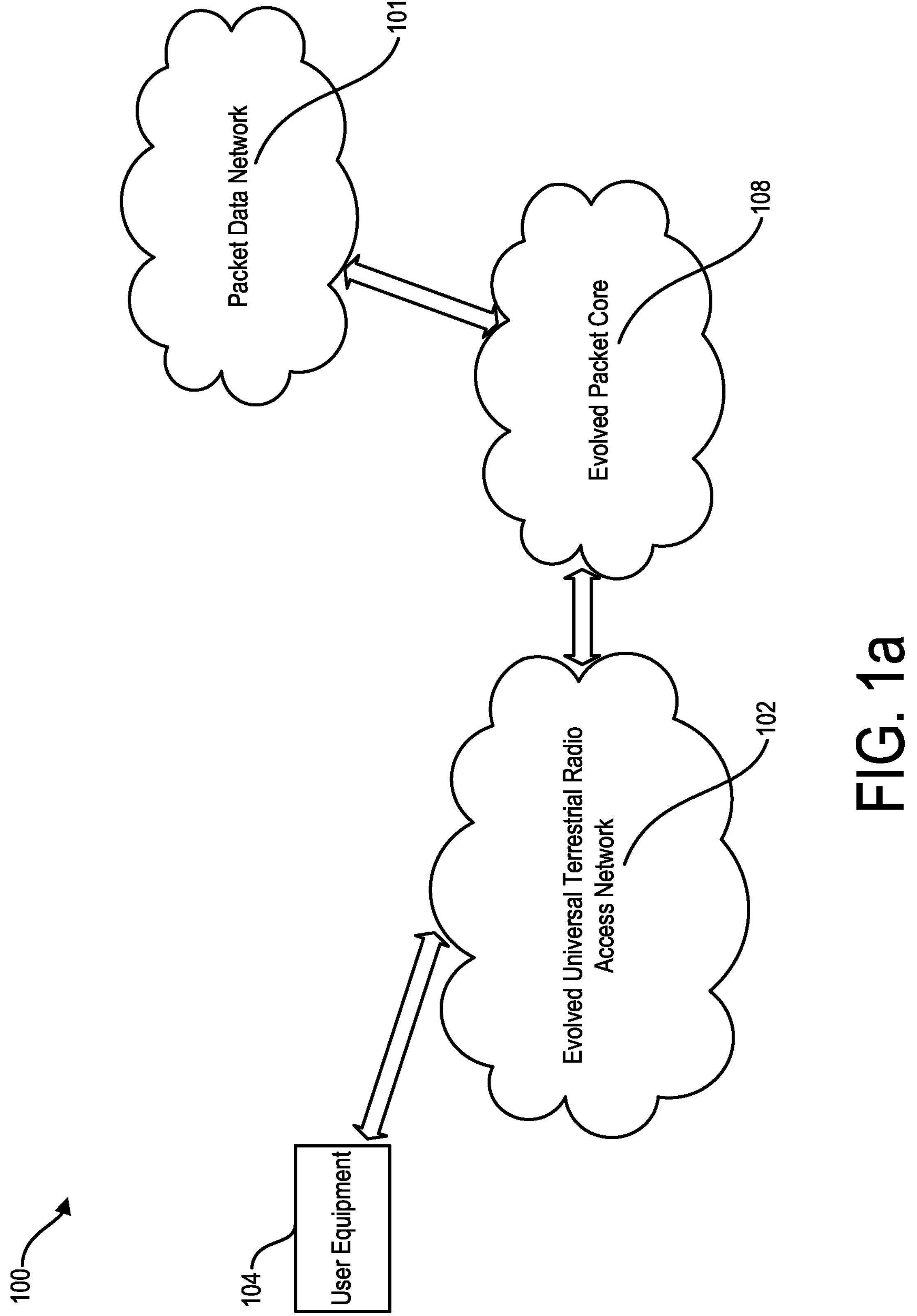
FIG. 1*a* illustrates an exemplary conventional long term evolution ("LTE") communications system.

The current subject matter can provide for systems and methods that can be implemented in wireless communications systems. Such systems can include various wireless communications systems, including 5G New Radio communications systems, long term evolution communication systems, etc.

In general, the current subject matter relates to managing cell sites in a radio access network (RAN).

In some implementations of the current subject matter, a device at a cell site in a radio access network (RAN), such as an open RAN (O-RAN), can be configured to run a cloud infrastructure thereon. Running a cloud infrastructure on the device, which is also referred to herein as a "node" or a "cell site node," may allow for time sensitive and/or real time RAN applications to be run at the cell site, e.g., at the cell site node, instead of at a location remote from the cell site, such as at a central management system of the cell site operator. Running a cloud infrastructure on the device may reduce network bandwidth use since the device need not communicate with a server or other hardware located remotely from the cell site, such as at a central management system of the cell site operator located remotely from the cell site, to access RAN applications since the RAN applications may be installed on the device itself. Network bandwidth is typically very constrained between cell sites and servers, so reducing network bandwidth as related to RAN applications may free bandwidth for other use(s) and thereby speed up and/or otherwise improve overall network function. Running a cloud infrastructure on the device may improve security over running cloud infrastructure on a server or other hardware located remotely from the cell site because the device need not communicate securely with the server or other hardware to access RAN applications since the cloud infrastructure is installed on the device itself. Secure communications, while typically effective and safe, can be compromised by hacker activity or other malicious activity and/or can be temporarily unavailable due to, e.g., network connectivity issues.

One or more aspects of the current subject matter can be incorporated into transmitter and/or receiver components of base stations (e.g., gNodeBs, eNodeBs, etc.) in such communications systems. The following is a general discussion of long-term evolution communications systems and 5G New Radio communication systems.

I. Long Term Evolution Communications System

FIGS. 1*a-c* and 2 illustrate an exemplary conventional long-term evolution ("LTE") communication system 100 along with its various components. An LTE system or a 4G LTE, as it is commercially known, is governed by a standard for wireless communication of high-speed data for mobile telephones and data terminals. The standard is an evolution of the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard was developed by the 3GPP ("3rd Generation Partnership Project").

Figure 1B:
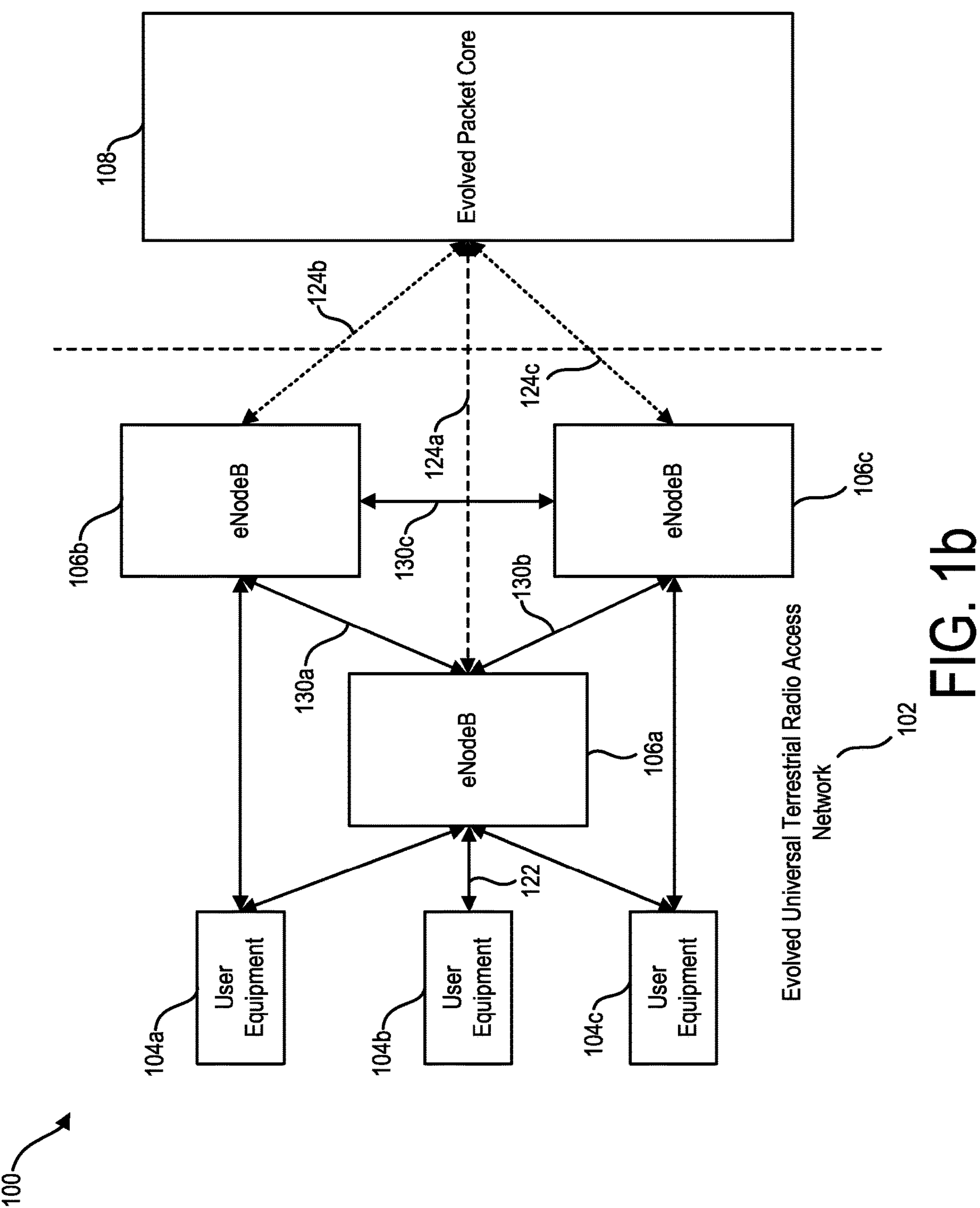
FIG. 1*b* illustrates further detail of the exemplary LTE system shown in FIG. 1*a:*

As shown in FIG. 1*a*, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (*a, b, c*) (as shown in FIG. 1*b*) that provide communication capabilities to a plurality of user equipment 104(*a, b, c*). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN

102 and EPC 108 work together to provide connectivity, mobility and services for the user equipment 104.

Figure 1C:
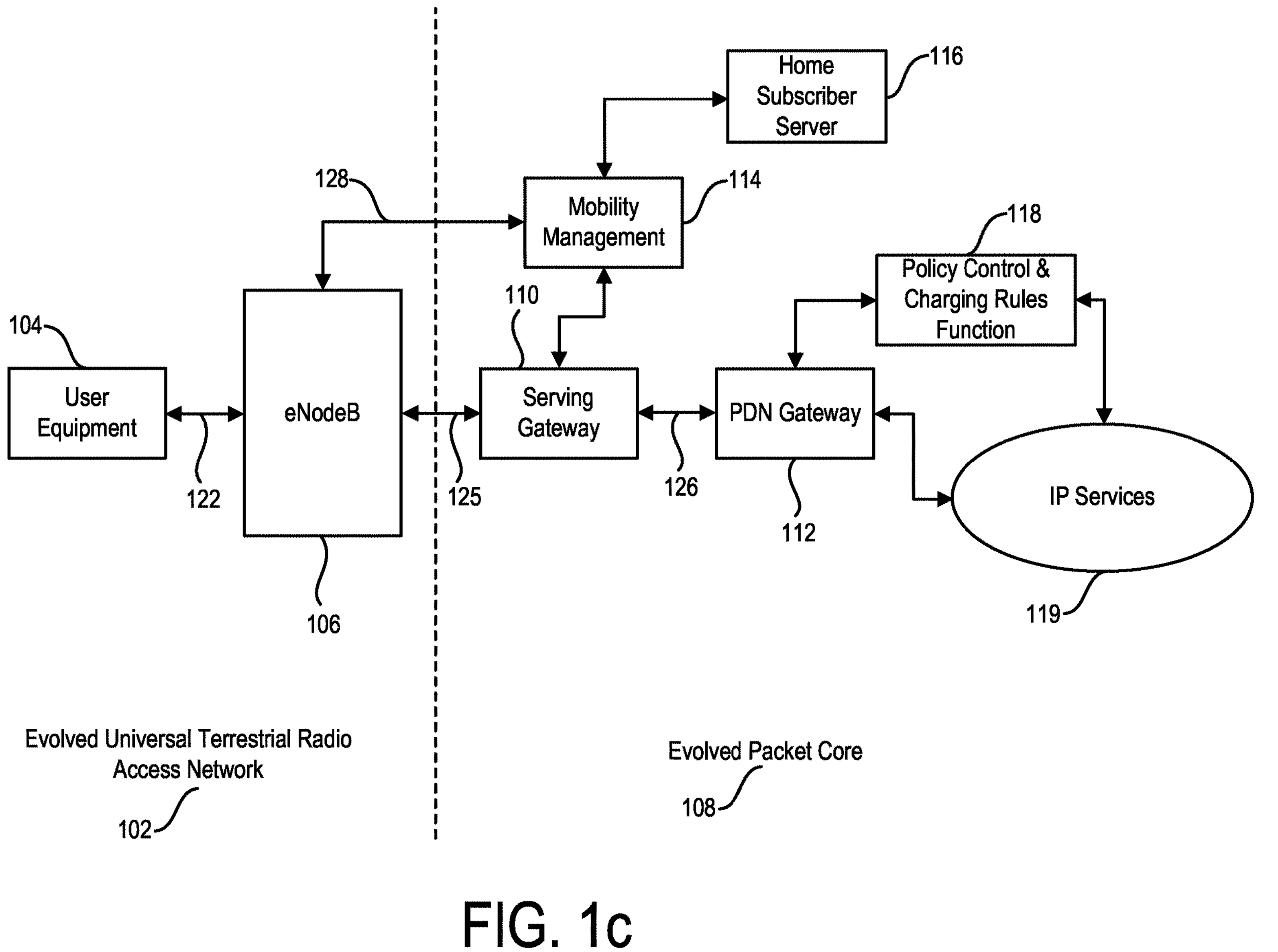
FIG. 1*c* illustrates additional detail of the evolved packet core of the exemplary LTE system shown in FIG. 1*a:*

FIG. 1*b* illustrates further detail of the network 100 shown in FIG. 1*a*. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs, as shown in FIG. 1*c*) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1*b*, the air interface 122 provides communication between user equipment 104*b* and the eNodeB 106*a*. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1*c*). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(*a, b, c*). As shown in FIG. 1*b*, X2 interface 130*a* provides interconnection between eNodeB 106*a* and eNodeB 106*b*: X2 interface 130*b* provides interconnection between eNodeB 106*a* and eNodeB 106*c*; and X2 interface 130*c* provides interconnection between eNodeB 106*b* and eNodeB 106*c*. The X2 interface can be established between two eNodeBs in order to provide an exchange of signals, which can include a load- or interference-related information as well as handover-related information. The eNodeBs 106 communicate with the evolved packet core 108 via an S1 interface 124(*a, b, c*). The S1 interface 124 can be split into two interfaces: one for the control plane (shown as control plane interface (S1-MME interface) 128 in FIG. 1*c*) and the other for the user plane (shown as user plane interface (S1-U interface) 125 in FIG. 1*c*).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1*c*. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1*a*). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QOS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1*a*).

Figure 1D:
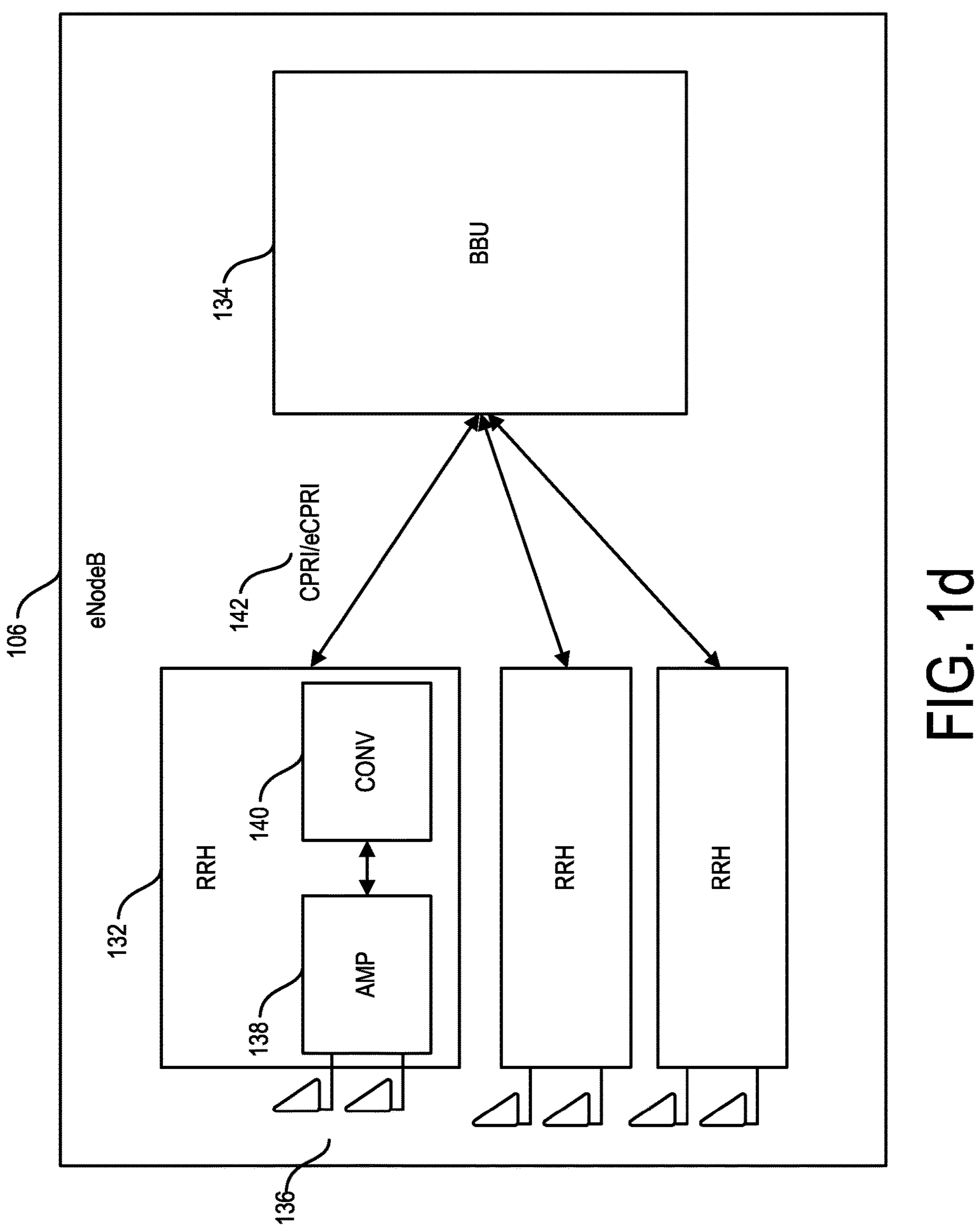
FIG. 1*d* illustrates an exemplary evolved Node B of the exemplary LTE system shown in FIG. 1*a:*

FIG. 1*d* illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI")/enhanced CPRI ("eCPRI") 142 standard specification either using RRH specific custom control and user plane framing methods or using O-RAN Alliance compliant Control and User plane framing methods. The operation of the eNodeB 106 can be characterized using the following standard parameters (and specifications): radio frequency band (Band4, Band9, Band17, etc.), bandwidth (5, 10, 15, 20 MHz), access scheme (downlink: OFDMA: uplink: SC-OFDMA), antenna technology (Single user and multi user MIMO; Uplink: Single user and multi user MIMO), number of sectors (6 maximum), maximum transmission rate (downlink: 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1*d*) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1*d*). Conversely, the RF signals that are received from user equipment 104 are amplified (using AMP 138) and converted (using CONV 140) to digital baseband signals for transmission to the BBU 134.

Figure 2:
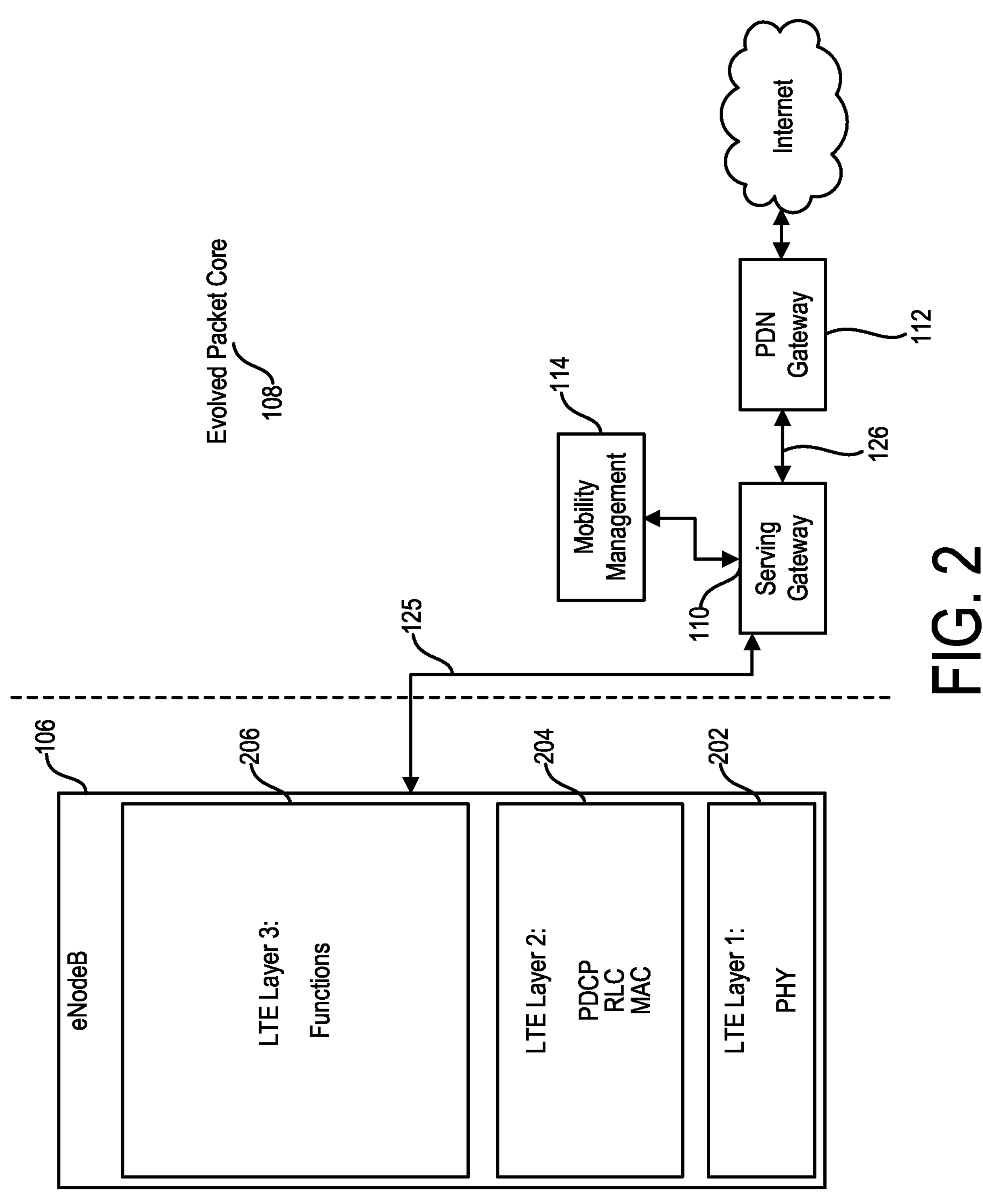
FIG. 2 illustrates further detail of an evolved Node B shown in FIGS. 1*a-d:*

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1*d*, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMEs and S-GWs. The eNodeB 106 selects an MME from a group of MMEs so the load can be shared by multiple MMEs to avoid congestion.

II. 5G NR Wireless Communications Networks

In some implementations, the current subject matter relates to a 5G new radio ("NR") communications system. The 5G NR is a next telecommunications standard beyond the 4G/IMT-Advanced standards. 5G networks offer at higher capacity than current 4G, allow higher number of mobile broadband users per area unit, and allow consumption of higher and/or unlimited data quantities in gigabyte per month and user. This can allow users to stream high-definition media many hours per day using mobile devices, even when it is not possible to do so with Wi-Fi networks. 5G networks have an improved support of device-to-device communication, lower cost, lower latency than 4G equipment and lower battery consumption, etc. Such networks have data rates of tens of megabits per second for a large number of users, data rates of 100 Mb/s for metropolitan areas, 1 Gb/s simultaneously to users within a confined area (e.g., office floor), a large number of simultaneous connections for wireless sensor networks, an enhanced spectral efficiency, improved coverage, enhanced signaling efficiency, 1-10 ms latency, reduced latency compared to existing systems.

Figure 3:
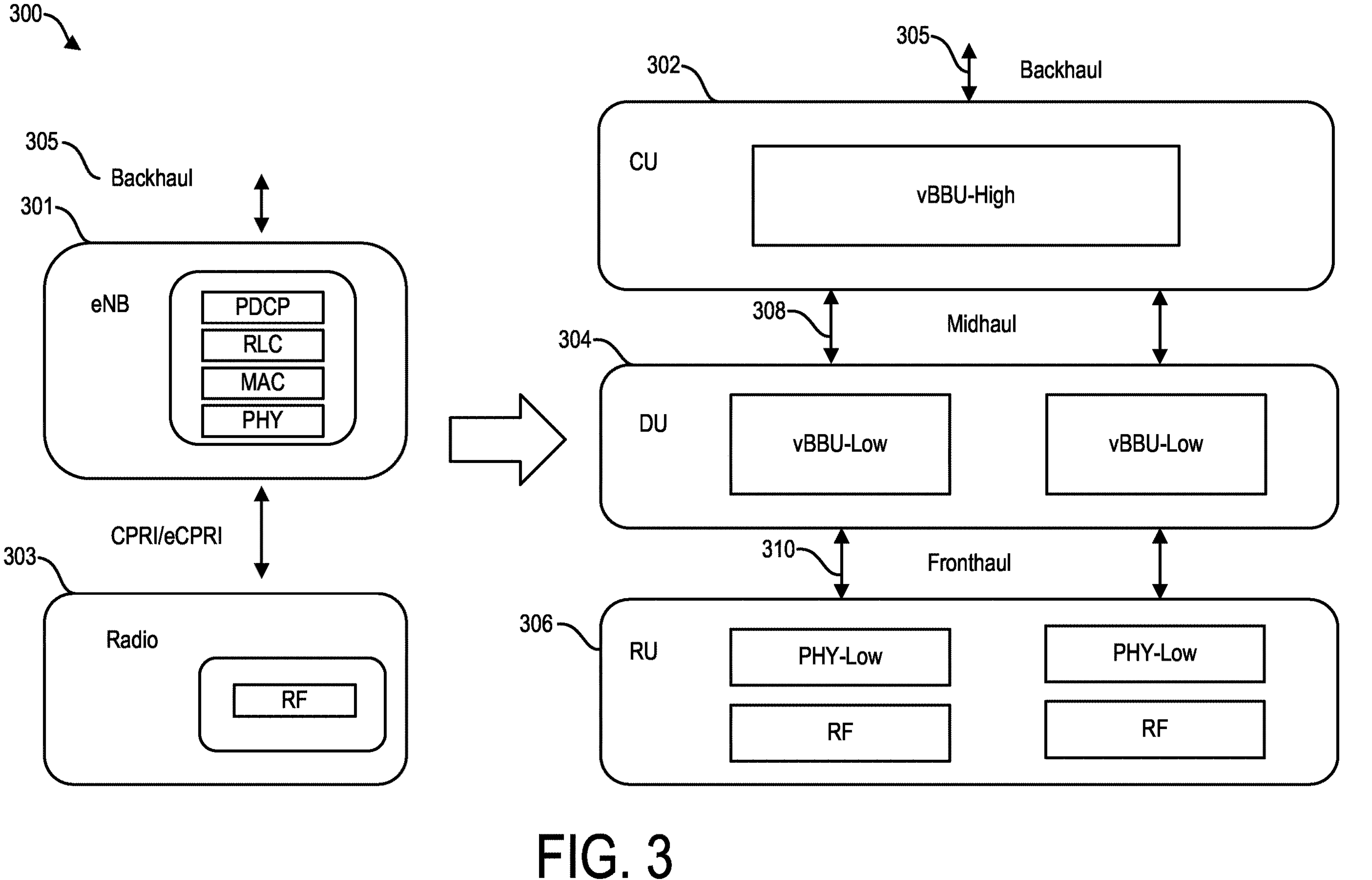
FIG. 3 illustrates an exemplary virtual radio access network, according to some implementations of the current subject matter.

FIG. 3 illustrates an exemplary virtual radio access network 300. The network 300 can provide communications between various components, including a base station (e.g., eNodeB, gNodeB) 301, a radio equipment 303, a centralized unit 302, a digital unit 304, and a radio device 306. The components in the system 300 can be communicatively coupled to a core using a backhaul link 305. A centralized unit ("CU") 302 can be communicatively coupled to a distributed unit ("DU") 304 using a midhaul connection 308. The radio frequency ("RU") components 306 can be communicatively coupled to the DU 304 using a fronthaul connection 310.

In some implementations, the CU 302 can provide intelligent communication capabilities to one or more DU units 304. The units 302, 304 can include one or more base stations, macro base stations, micro base stations, remote radio heads, etc. and/or any combination thereof.

In lower layer split architecture environment, a CPRI bandwidth requirement for NR can be 100 s of Gb/s. CPRI compression can be implemented in the DU and RU (as shown in FIG. 3). In 5G communications systems, compressed CPRI over Ethernet frame is referred to as eCPRI and is the recommended fronthaul network. The architecture can allow for standardization of fronthaul/midhaul, which can include a higher layer split (e.g., Option 2 or Option 3-1 (Upper/Lower RLC split architecture)) and fronthaul with L1-split architecture (Option 7).

In some implementations, the lower layer-split architecture (e.g., Option 7) can include a receiver in the uplink, joint processing across multiple transmission points (TPs)

for both DL/UL, and transport bandwidth and latency requirements for ease of deployment. Further, the current subject matter's lower layer-split architecture can include a split between cell-level and user-level processing, which can include cell-level processing in remote unit ("RU") and user-level processing in DU. Further, using the current subject matter's lower layer-split architecture, frequency-domain samples can be transported via Ethernet fronthaul, where the frequency-domain samples can be compressed for reduced fronthaul bandwidth.

Figure 4:
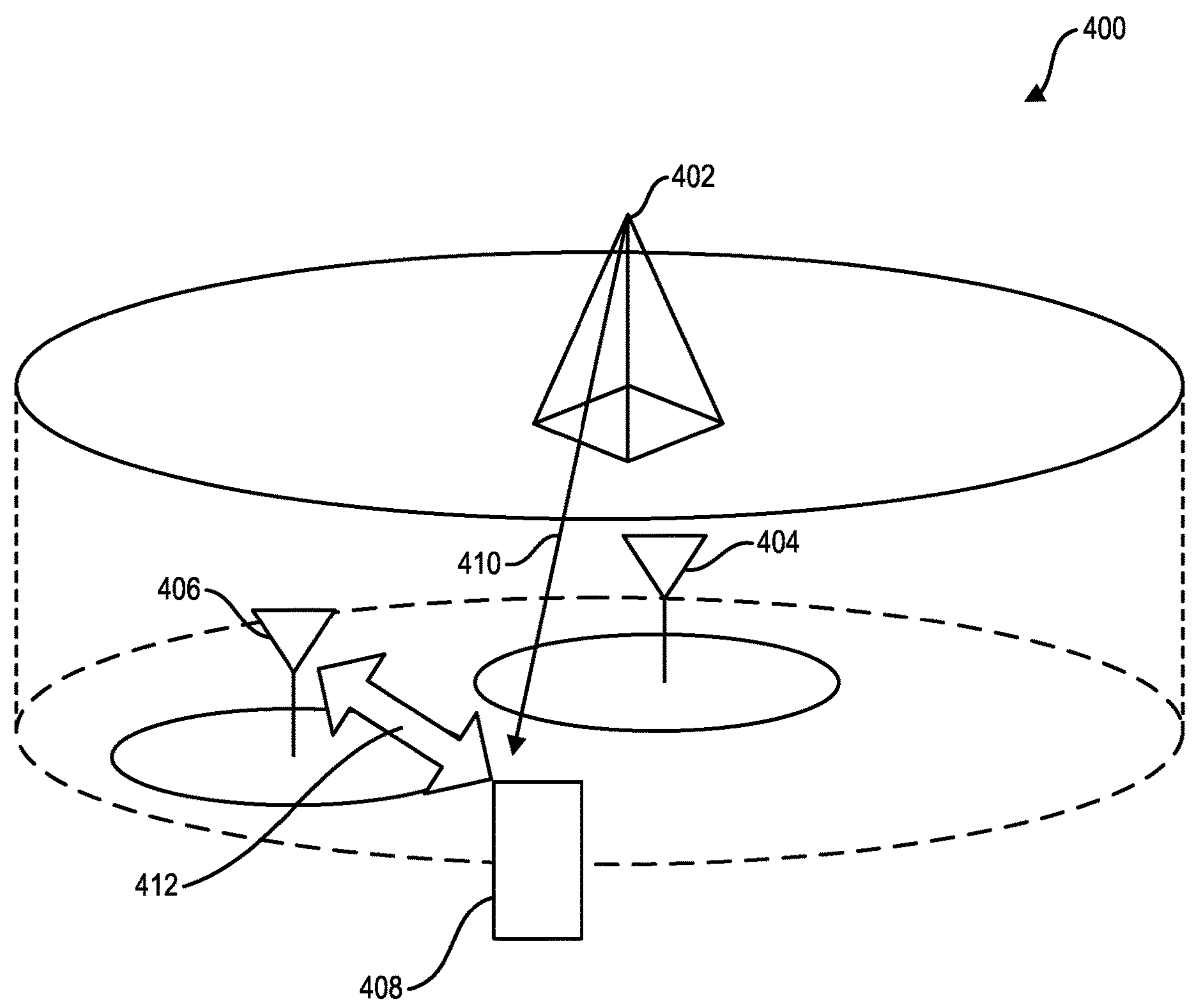
FIG. 4 illustrates an exemplary 3GPP split architecture to provide its users with use of higher frequency bands.

FIG. 4 illustrates an exemplary communications system 400 that can implement a 5G technology and can provide its users with use of higher frequency bands (e.g., greater than 10 GHz). The system 400 can include a macro cell 402 and small cells 404, 406.

A mobile device 408 can be configured to communicate with one or more of the small cells 404, 406. The system 400 can allow splitting of control planes (C-plane) and user planes (U-plane) between the macro cell 402 and small cells 404, 406, where the C-plane and U-plane are utilizing different frequency bands. In particular, the small cells 404, 406 can be configured to utilize higher frequency bands when communicating with the mobile device 408. The macro cell 402 can utilize existing cellular bands for C-plane communications. The mobile device 408 can be communicatively coupled via U-plane 412, where the small cell (e.g., small cell 406) can provide higher data rate and more flexible/cost/energy efficient operations. The macro cell 402, via C-plane 410, can maintain good connectivity and mobility. Further, in some cases, LTE and NR can be transmitted on the same frequency.

Figure 5A:
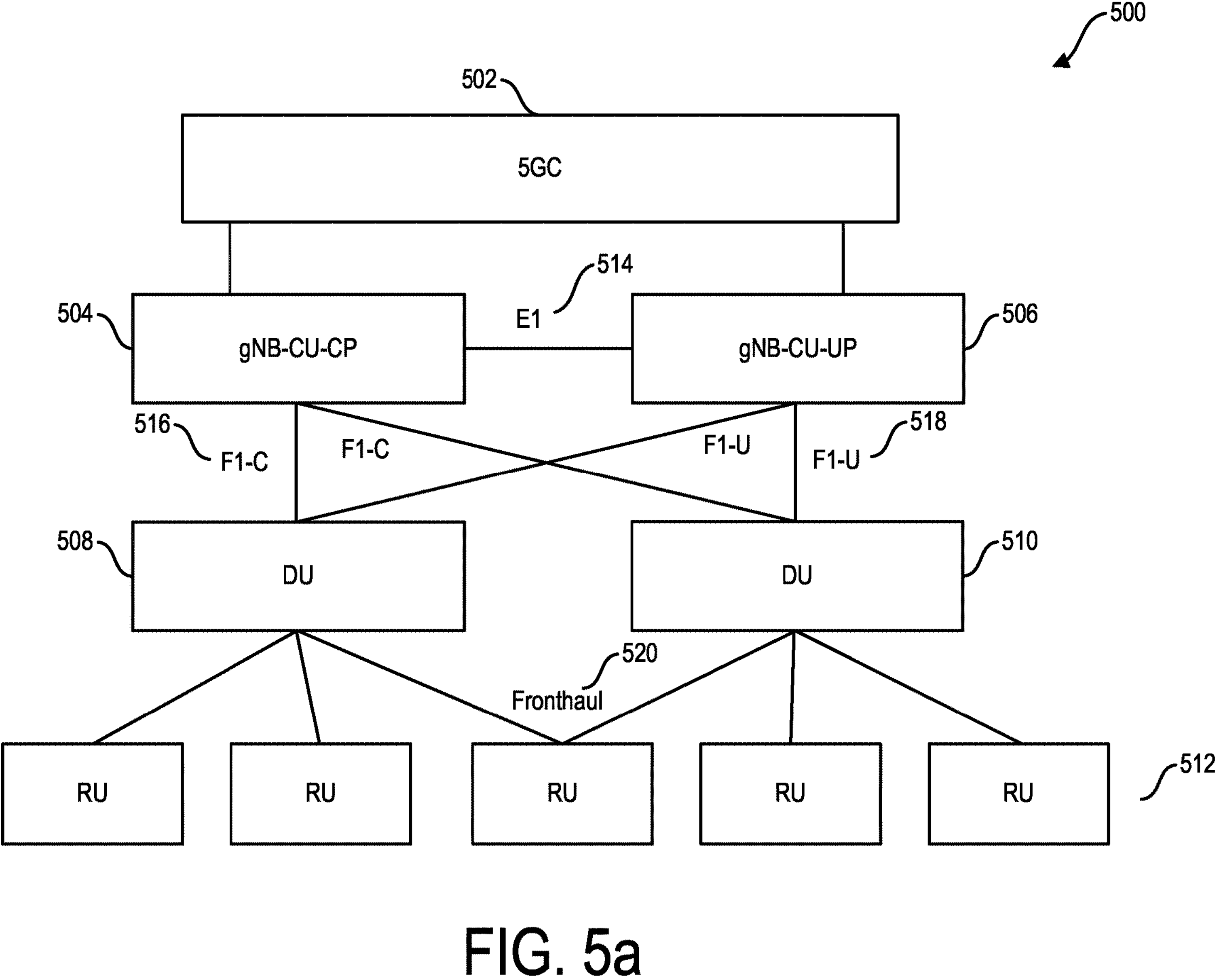
FIG. 5*a* illustrates an exemplary 5G wireless communication system.

FIG. 5*a* illustrates an exemplary 5G wireless communication system 500, according to some implementations of the current subject matter. The system 500 can be configured to have a lower layer split architecture in accordance with Option 7-2. The system 500 can include a core network 502 (e.g., 5G Core) and one or more gNodeBs (or gNBs), where the gNBs can have a centralized unit gNB-CU. The gNB-CU can be logically split into control plane portion, gNB-CU-CP, 504 and one or more user plane portions, gNB-CU-UP, 506. The control plane portion 504 and the user plane portion 506 can be configured to be communicatively coupled using an E1 communication interface 514 (as specified in the 3GPP Standard). The control plane portion 504 can be configured to be responsible for execution of the RRC and PDCP protocols of the radio stack.

The control plane and user plane portions 504, 506 of the centralized unit of the gNB can be configured to be communicatively coupled to one or more distributed units (DU) 508, 510, in accordance with the higher layer split architecture. The distributed units 508, 510 can be configured to execute RLC, MAC and upper part of PHY layers protocols of the radio stack. The control plane portion 504 can be configured to be communicatively coupled to the distributed units 508, 510 using F1-C communication interfaces 516, and the user plane portions 506 can be configured to be communicatively coupled to the distributed units 508, 510 using F1-U communication interfaces 518. The distributed units 508, 510 can be coupled to one or more remote radio units (RU) 512 via a fronthaul network 520 (which may include one or switches, links, etc.), which in turn communicate with one or more user equipment (not shown in FIG. 5*a*). The remote radio units 512 can be configured to execute a lower part of the PHY layer protocols as well as provide antenna capabilities to the remote units for communication with user equipments (similar to the discussion above in connection with FIGS. 1*a*-2).

Figure 5B:
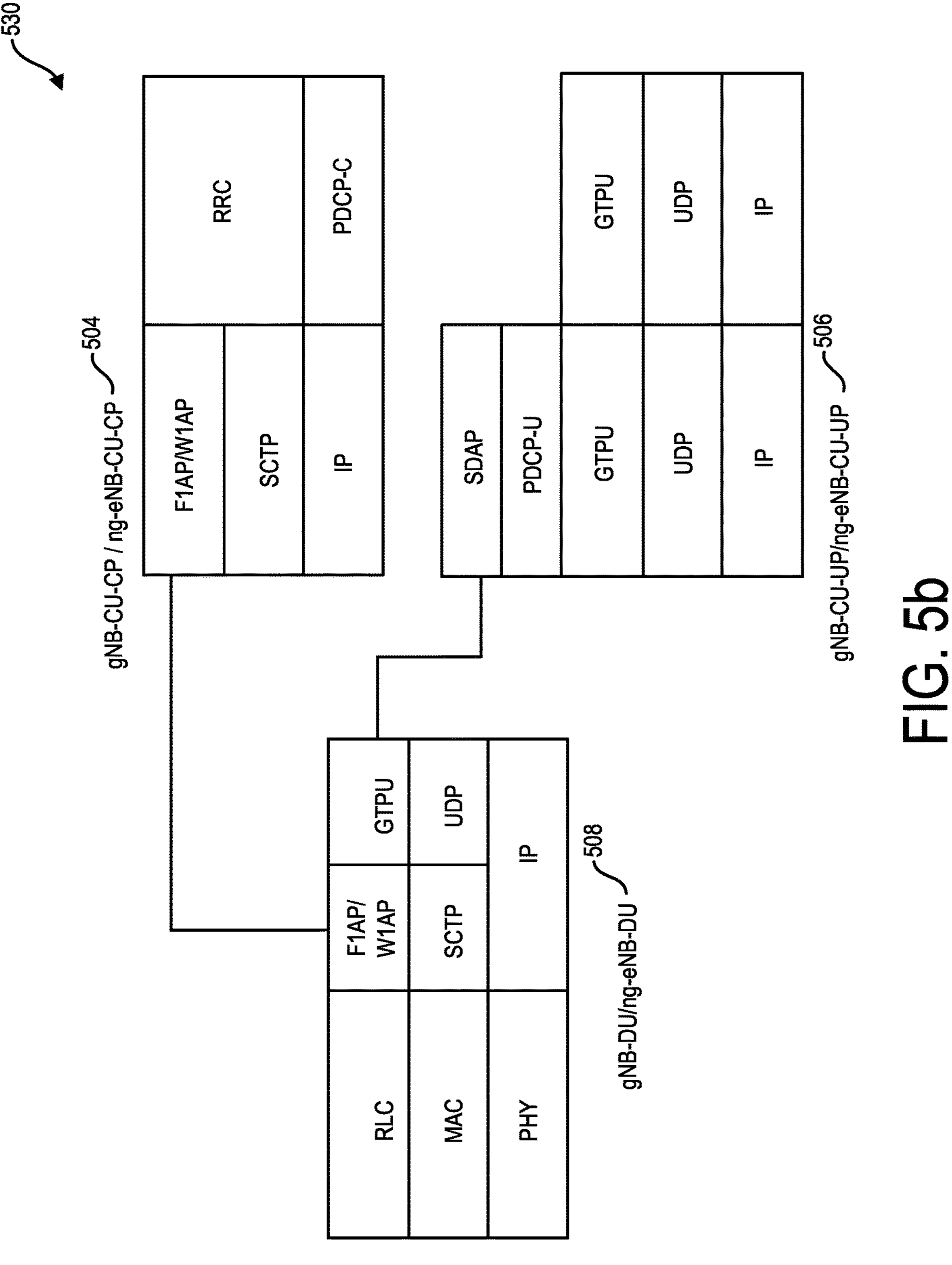
FIG. 5*b* illustrates an exemplary layer architecture of the split gNB and/or a split ng-eNB (e.g., next generation eNB that may be connected to 5GC)

FIG. 5*b* illustrates an exemplary layer architecture 530 of the split gNB. The architecture 530 can be implemented in the communications system 500 shown in FIG. 5*a*, which can be configured as a virtualized disaggregated radio access network (RAN) architecture, whereby layers L1, L2, L3 and radio processing can be virtualized and disaggregated in the centralized unit(s), distributed unit(s) and radio unit(s). As shown in FIG. 5*b*, the gNB-DU 508 can be communicatively coupled to the gNB-CU-CP control plane portion 504 (also shown in FIG. 5*a*) and gNB-CU-UP user plane portion 506. Each of components 504, 506, 508 can be configured to include one or more layers.

The gNB-DU 508 can include RLC, MAC, and PHY layers as well as various communications sublayers. These can include an F1 application protocol (F1-AP) sublayer, a GPRS tunneling protocol (GTPU) sublayer, a stream control transmission protocol (SCTP) sublayer, a user datagram protocol (UDP) sublayer and an internet protocol (IP) sublayer. As stated above, the distributed unit 508 may be communicatively coupled to the control plane portion 504 of the centralized unit, which may also include F1-AP, SCTP, and IP sublayers as well as radio resource control, and PDCP-control (PDCP-C) sublayers. Moreover, the distributed unit 508 may also be communicatively coupled to the user plane portion 506 of the centralized unit of the gNB. The user plane portion 506 may include service data adaptation protocol (SDAP), PDCP-user (PDCP-U), GTPU, UDP and IP sublayers.

Figure 5C:
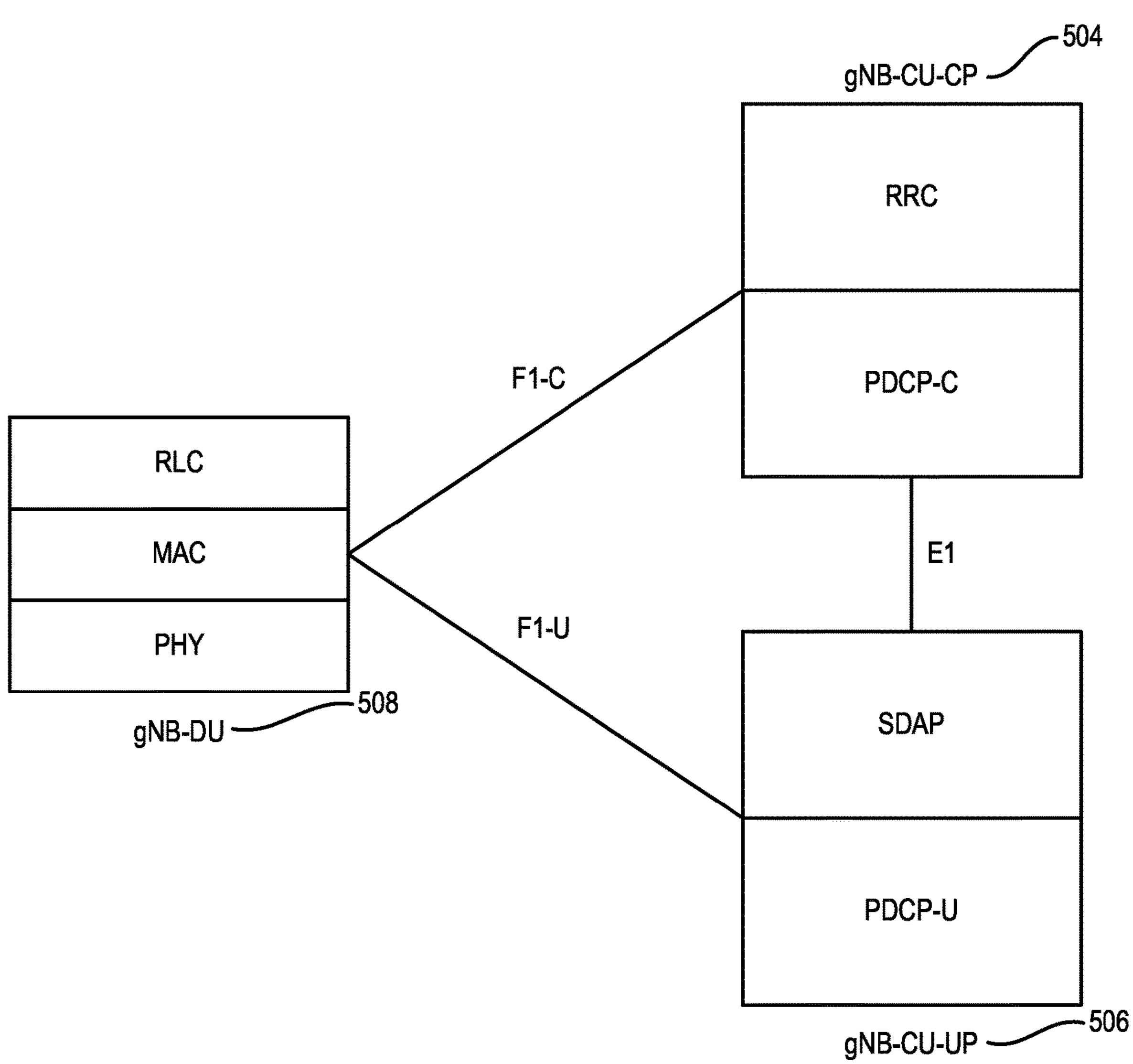
FIG. 5*c* illustrates an exemplary functional split in the gNB architecture shown in FIGS. 5*a-b;*

FIG. 5*c* illustrates an exemplary functional split in the gNB architecture shown in FIGS. 5*a*-*b*. As shown in FIG. 5*c*, the gNB-DU 508 may be communicatively coupled to the gNB-CU-CP 504 and GNB-CU-UP 506 using an F1-C communication interface. The gNB-CU-CP 504 and GNB-CU-UP 506 may be communicatively coupled using an E1 communication interface. The higher part of the PHY layer (or Layer 1) may be executed by the gNB-DU 508, whereas the lower parts of the PHY layer may be executed by the RUs (not shown in FIG. 5*c*). As shown in FIG. 5*c*, the RRC and PDCP-C portions may be executed by the control plane portion 504, and the SDAP and PDCP-U portions may be executed by the user plane portion 506.

Some of the functions of the PHY layer in 5G communications network can include error detection on the transport channel and indication to higher layers, FEC encoding/decoding of the transport channel, hybrid ARQ soft-combining, rate matching of the coded transport channel to physical channels, mapping of the coded transport channel onto physical channels, power weighting of physical channels, modulation and demodulation of physical channels, frequency and time synchronization, radio characteristics measurements and indication to higher layers, MIMO antenna processing, digital and analog beamforming, RF processing, as well as other functions.

The MAC sublayer of Layer 2 can perform beam management, random access procedure, mapping between logical channels and transport channels, concatenation of multiple MAC service data units (SDUs) belonging to one logical channel into transport block (TB), multiplexing/demultiplexing of SDUs belonging to logical channels into/from TBs delivered to/from the physical layer on transport channels, scheduling information reporting, error correction through HARQ, priority handling between logical channels of one UE, priority handling between UEs by means of dynamic scheduling, transport format selection, and other functions. The RLC sublayer's functions can include transfer of upper layer packet data units (PDUs), error correction through ARQ, reordering of data PDUs, duplicate and protocol error detection, re-establishment, etc. The PDCP sublayer can be responsible for transfer of user data, various functions during re-establishment procedures, retransmission of SDUs, SDU discard in the uplink, transfer of control plane data, and others.

Layer 3's RRC sublayer can perform broadcasting of system information to NAS and AS, establishment, maintenance and release of RRC connection, security, establishment, configuration, maintenance and release of point-point radio bearers, mobility functions, reporting, and other functions.

III. Managing Cell Sites In A Radio Access Network

In some implementations of the current subject matter, a device at a cell site in a radio access network (RAN), such as an open RAN (O-RAN), can be configured to run a cloud infrastructure thereon. Running a cloud infrastructure on the device, which is also referred to herein as a "node" or a "cell site node," may allow for time sensitive and/or real time RAN applications to be run at the cell site, e.g., at the cell site node, instead of at a location remote from the cell site, such as at a central management system of the cell site operator. Running a cloud infrastructure on the device may reduce network bandwidth use since the device need not communicate with a server or other hardware located remotely from the cell site, such as at a central management system of the cell site operator located remotely from the cell site, to access RAN applications since the RAN applications may be installed on the device itself. Network bandwidth is typically very constrained between cell sites and servers, so reducing network bandwidth as related to RAN applications may free bandwidth for other use(s) and thereby speed up and/or otherwise improve overall network function. Running a cloud infrastructure on the device may improve security over running cloud infrastructure on a server or other hardware located remotely from the cell site because the device need not communicate securely with the server or other hardware to access RAN applications since the cloud infrastructure is installed on the device itself. Secure communications, while typically effective and safe, can be compromised by hacker activity or other malicious activity and/or can be temporarily unavailable due to, e.g., network connectivity issues.

The device can be configured to manage the cloud infrastructure thereon. The device can be configured to automatically configure the cloud infrastructure thereon. The device therefore does not need to be configured via secure connection to a server or other hardware, which as mentioned above can be compromised by hacker activity or other malicious activity and/or can be temporarily unavailable. The device at the cell site also does not need manual intervention to start configuration of the cloud infrastructure thereon. Personnel thus does not need to travel to the cell site to manually configure the cloud infrastructure thereon, which would take time and incur costs. A plurality of devices are typically deployed at each of a plurality of cell sites, so time and cost savings may be significant by providing automatic configuration of cloud infrastructure at a device. Additionally, cell sites are typically not physically secured, so cell site nodes are typically at non-secure locations, which makes the cell site nodes vulnerable to physical attack and tampering. Personnel not needing to be physically present at the cell site as related to the cloud infrastructure may thus reduce a number of times personnel visit the cell site, which may reduce opportunities for physical attack and tampering and/or may make it easier to identify possible physical attack and tampering since a person being present at a cell site may be more easily identifiable as a potential threat to security at the cell site.

The device can have an agent, also referred to herein as a "software agent," installed thereon, e.g., stored in a memory of the device, prior to the device being delivered to the cell site. For example, the agent can be installed on the device, e.g., stored in a memory of the device, as part of the device's manufacturing process. After the device has been delivered to the cell site and set up as needed, e.g., by being removed from packaging, connected to power, etc., the agent can be configured to automatically trigger an installation process in which the cloud infrastructure is configured on the device. The installation process can include the device communicating with and downloading software, which can include one or more RAN applications, from a server or other hardware located remotely from the cell site, such as at a central management system of the cell site operator located remotely from the cell site. The software can include a plurality of software modules. Each of the software modules can correspond to a RAN application. The installation process can also include the downloaded software being installed on the device, e.g., in a memory of the device and executable by a processor of the device, to be ready for use.

The agent installed on the device may allow for the cloud infrastructure to be installed on the device as appropriate for the particular cell site at which the device is deployed. Different cell sites may have different requirements based on, e.g., location, other device(s) at the cell site with which the cell site node must communicate, etc. Thus, the cell site node may not have installed thereon unnecessary software, thereby conserving computer system resources for other use(s), and/or the cell site node may be ensured to be compatible with other device(s) at the cell site.

The agent installed on the cell site node may allow for the cloud infrastructure installed thereon to be updated at any time and any number of times. The cloud infrastructure may thus be able to run most efficiently with the most currently available software, e.g., the most currently available RAN applications. A server or other hardware located remotely from the cell site, such as at a central management system of the cell site operator located remotely from the cell site, can be configured to trigger the updating by transmitting a message to the device. The device can thus be dynamically updated as needed so up-to-date software, e.g., up-to-date RAN applications, may be used, and personnel need not visit the cell site to manually provide the update.

In some implementations, the device includes a base station (e.g., gNodeB or gNB, eNodeB or eNB, ng-eNodeB or ng-eNB), such as those shown in and discussed above with regard to FIGS. 1*a*-5*c*. In some implementations, the device includes a DU (e.g., DU 304 of FIG. 3, DUs 508, 510 of FIGS. 5*a*-5*c*, etc.) of the base station.

Figure 6:
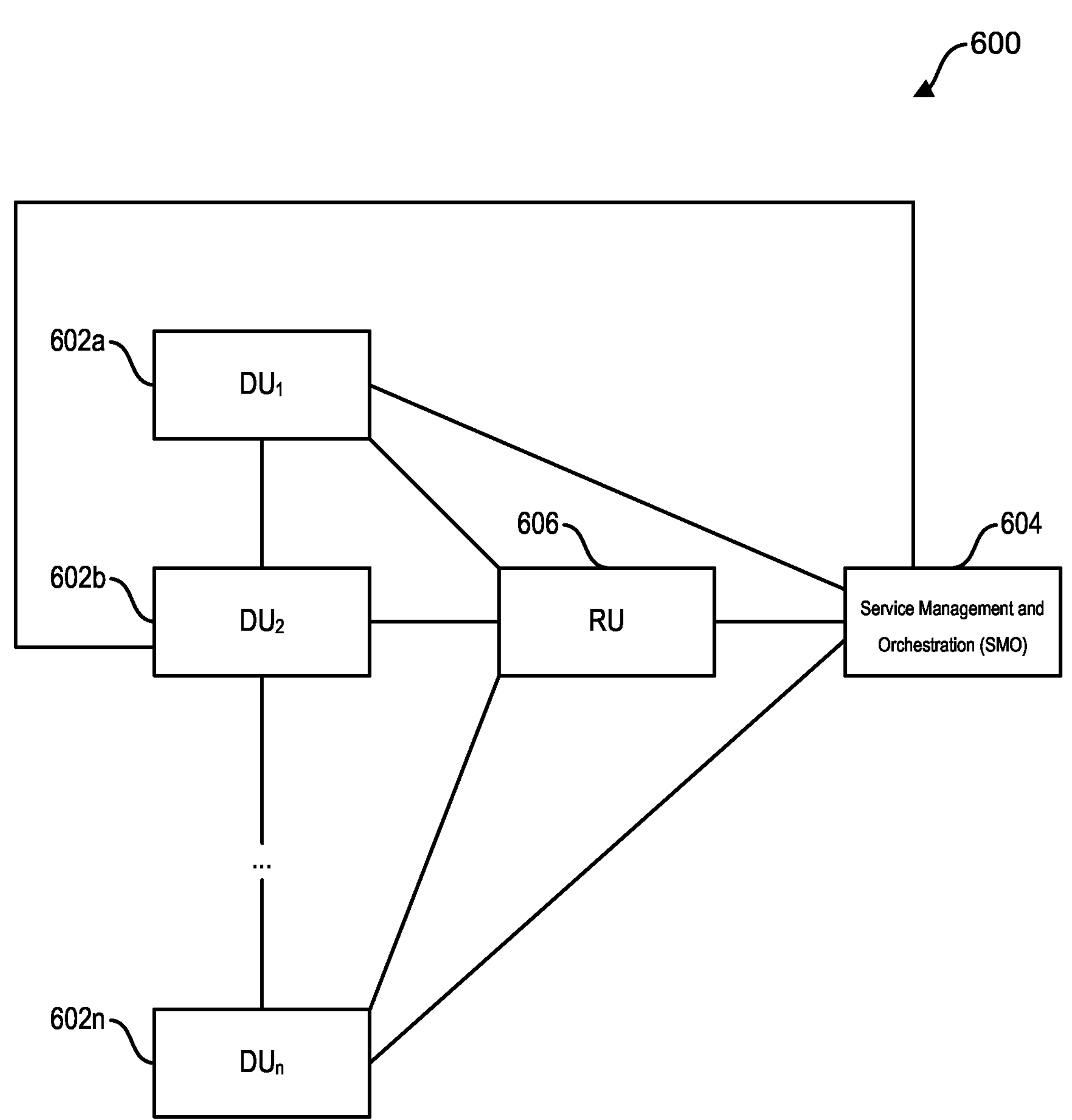
FIG. 6 illustrates an exemplary system for managing cell sites in a radio access network, according to some implementations of the current subject matter.

FIG. 6 illustrates an exemplary system 600 for managing cell sites in a radio access network, according to some implementations of the current subject matter. The system 600 can include a radio access network, such as an O-RAN, operating in a wireless communication system (e.g., 4G, LTE, 5G, etc.). As in this illustrated implementation, the system 600 can include one or more distributed units $DU_1$ 602*a*, $DU_2$ 602*b*, . . . $DU_n$ 602*n*, a service management and orchestration (SMO) component 604, and a radio unit (RU) 606.

The DUs 602*a*, 602*b*, . . . 602*n* can be configured to be communicatively coupled to the SMO component 604. The SMO component 604 can be configured to be communicatively coupled to the RU 606. Two or more DUs 602*a*, 602*b*, . . . 602*n* can be configured be communicatively coupled to one another, where one of the DUs 602*a*, 602*b*, . . . 602*n* (e.g., a first $DU_1$ 602*a*) can be implemented and/or can serve as a host and/or a primary distributed unit while one or more other of the DUs 602*a*, 602*b*, . . . 602*n* (e.g., second to nth DUs 602*b*, . . . 602*n*) can be implemented and/or serve as tenant and/or secondary and/or shared resource operator distributed units.

Figure 7:
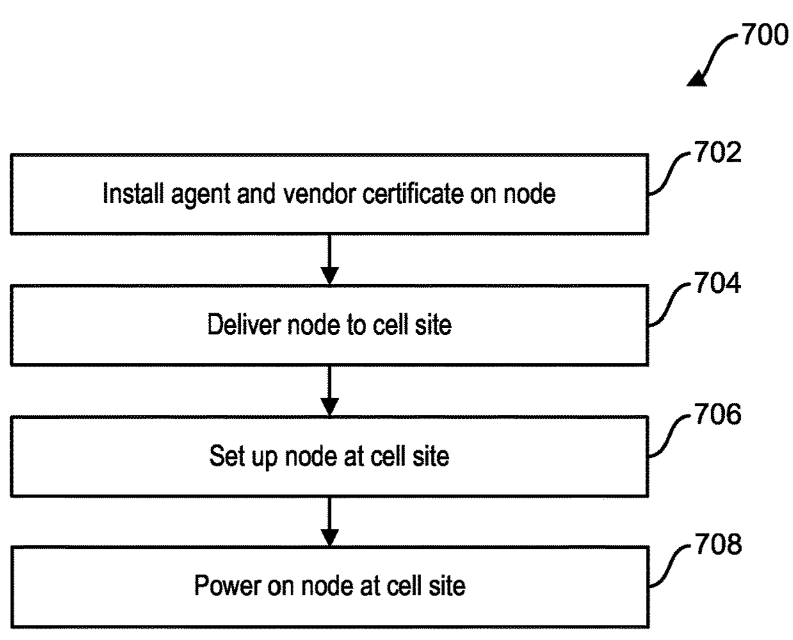
FIG. 7 illustrates an exemplary process for cell site node setup, according to some implementations of the current subject matter.

FIG. 7 illustrates an exemplary process 700 for cell site node setup, according to some implementations of the current subject matter. In general, the cell site node setup process 700 can set up a cell site node for cloud infrastructure management. The cell site node setup process 700 can occur in its entirety before the cell site node begins to communicate on a cellular network.

The cell site node being set up in the cell site node setup process 700 can be a DU (e.g., a distributed unit such as DU 304 of FIG. 3, DUs 508, 510 of FIGS. 5*a*-5*c*, DUs 602*a*, 602*b*, 602*n* of FIG. 6, etc.). The process 700 can be executed using a system described herein such as the system 600 shown in FIG. 6. In particular, one of the DUs 602*a*, 602*b*, . . . 602*n* can be the cell site node being set up, and the process 700 can be executed for any number of the DUs 602*a*, 602*b*, . . . 602*n* (e.g., all of the DUs 602*a*, 602*b*, . . . 602*n*) so as to set up each of the number of DUs 602*a*, 602*b*, . . . 602*n*.

The cell site node setup process 700 can include installing 702 an agent on the cell site node. The agent installation 702 can generally include storing the agent in a memory of the cell site node. The agent can be configured to be executed by a processor, e.g., a processor of the cell site node communicatively coupled to the memory storing the agent. The agent can be configured to be automatically executed by the processor, as discussed further below. Execution of the agent can be configured to begin verification of the cell site node and, after verification, configuration of cloud infrastructure on the cell site node, as also discussed further below.

The installation 702 can also include installing a vendor certificate, also referred to herein as a "first certificate," on the cell site node. The vendor certificate can be provided by a vendor (e.g., a manufacturer, verified seller, etc.) of the cell site node. The vendor certificate can certify that the cell site node is a verified cell site node of the vendor. The vendor certificate installation 702 can generally include storing the vendor certificate in a memory of the cell site node.

The agent and the vendor certificate can be installed 702 on the cell site node during manufacturing of the cell site node. The agent and vendor certificate being installed 702 during manufacturing may help ensure that the agent and vendor certificate are not corrupt and/or are available for immediate use when the cell site node is first used, such as when the cell site node is first powered on at a cell site. The agent and vendor certificate installation 702 can occur at any appropriate point(s) during the manufacturing process when the agent and vendor certificate can be successfully and safely installed on the cell site node. The agent can be installed 702 before the vendor certificate, or the vendor certificate can be installed 702 before the agent.

The cell site node setup process 700 can also include, after the agent and the certificate have been installed 702 on the cell site node, delivering 704 the cell site node to a cell site where the cell site node will be deployed and used for communication in a wireless communication system. Post-manufacturing, the cell site node can be delivered 704 to a cell site in any number of ways and along any number of transportation paths by any number of authorized delivery personal in accordance with the particular cell site node's typical delivery process.

After the cell site node has been delivered 704 to the cell site and set up 706 as needed, e.g., by being removed from packaging, connected to power, etc., the cell site node can be powered on 708. In some implementations, powering on 708 the cell site node can automatically trigger execution of the agent installed 702 on the cell site node, e.g., trigger the processor to execute the agent stored in memory. Cloud infrastructure may thus be automatically configured at the cell site node in response to the powering on 708 of the device. Time delay in cloud infrastructure configuration may thus be avoided. Automatic configuration of the cloud infrastructure may improve security since personnel does not need not access the device, e.g., to provide an input thereto, to begin cloud infrastructure configuration since mere powering on 708 of the device can trigger the cloud infrastructure installation. In other implementations, execution of the agent can be manually triggered after the cell site node has been powered on 708. Manually triggering agent execution may allow for delaying use of the device at the cell site, which may be desirable, for example, if testing is desired before full use of a device. The manual triggering may be performed locally by personnel on site at the cell site who is authorized to access the device.

Figure 8:
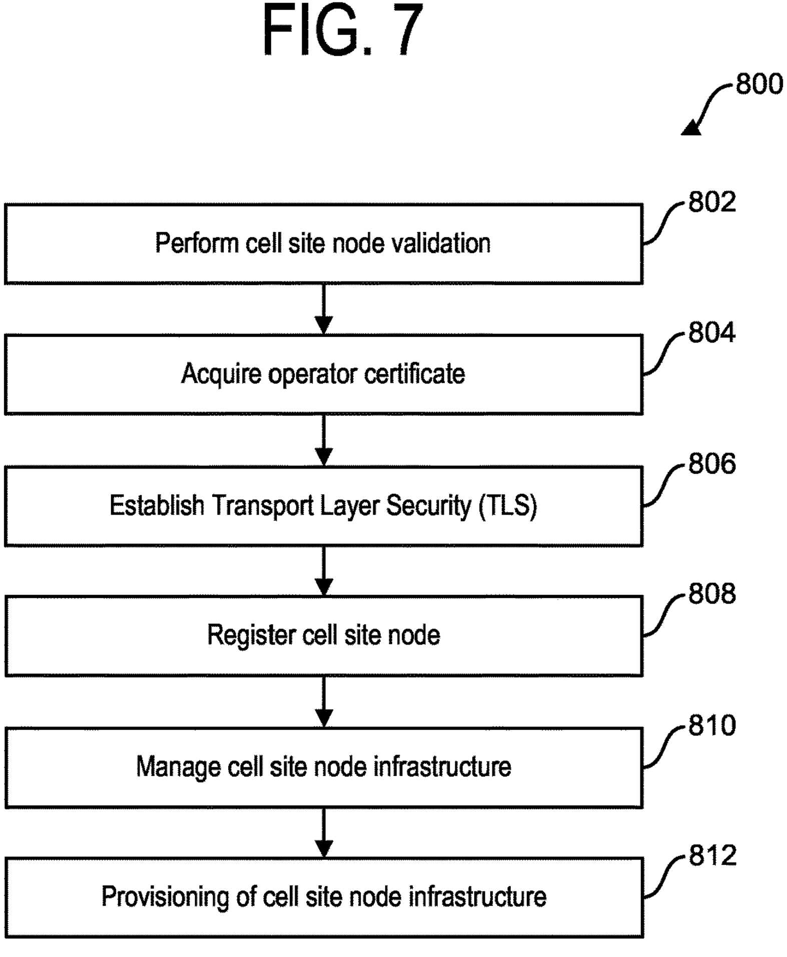
FIG. 8 illustrates an exemplary process for cell site node management, according to some implementations of the current subject matter.

After the cell site node has been set up, e.g., according to the cell site node setup process 700 of FIG. 7, cloud infrastructure can be managed at the cell site node. FIG. 8 illustrates an exemplary process 800 for cell site node management, according to some implementations of the current subject matter. In general, the cell site node management process 800 can manage cloud infrastructure at the cell site node.

The cell site node management process 800 can include performing 802 cell site node verification. In general, cell site node verification can include a first server, e.g., a server of the cellular network operator such as a Dynamic Host Configuration Protocol (DHCP) server (e.g., as provided by a PDN such as PDN 101 of FIG. 1, etc.), validating the cell site node based on the vendor certificate installed on the cell site node. The cell site node can encrypt and send the encrypted vendor certificate to the first server, which can decrypt and verify the vendor certificate.

If the cell site node is validated by verifying the vendor certificate, the cell site node is authorized to communicate on the cellular network with which the cell site is associated and the first server can transmit an IP address to the cell site node for the cell site node to use for communications on the wireless network, and the cell site node management process 800 continues.

If the cell site node is not validated by not verifying the vendor certificate, the cell site node is not authorized to communicate on the cellular network with which the cell site is associated, and the cell site node management process 800 ends. The unauthorized device may thus be prevented from communicating on the cellular network. An error handling process may be performed if the cell site node is not validated by not verifying the vendor certificate. The error handling process can address the presence of the unauthorized device according to the cell site operator's traditional error handling protocol, such as by re-attempting the verification a predetermined number of times (e.g., one time, two times, etc.) within a predetermined amount of time (e.g., thirty seconds, one minutes, etc.) before finalizing the non-validation determination. The non-validation determination may automatically trigger an alarm, such as transmission of an email, transmission of an email, an audible sound, a visible warning light, etc., that notifies appropriate personnel that manual intervention may be required to address the problem.

FIG. 9 illustrates an exemplary process 900 for performing 802 the cell site node verification, according to some implementations of the current subject matter. FIG. 9 illustrates communications between the cell site node and the first server, which is shown as a DHCP server in FIG. 9. The communications between the cell site node and the first server can be secure, such as by using encryption, as will be appreciated by those skilled in the art.

The cell site node verification process 900 can include the agent installed on the cell site node identifying 902 a management virtual local area network (MGMT VLAN), enterprise number (enterprise-no), and interface from provisioning data pre-installed on the cell site node during manufacturing. The process 900 can also include the agent creating 904 any bonded single root I/O virtualization (SRIOV) interfaces needed to set up the MGMT VLAN interface.

The cell site node verification process 900 can also include, after the identifying 902 and the creating 904, the cell site node transmitting 906 a request (e.g., a DHCPv6 solicit request) to the DHCP server over the identified 902 MGMT VLAN. The request can include the identified enterprise number and can include an identification of the cell site node. The identification can be, for example, a serial number of the device. In this illustrated embodiment, the cell site node is a DU, and the identification of the cell site node shown in FIG. 9 is therefore a DU identification (DUID).

The DHCP server receives the request and performs 908 security validation to validate the cell site node. The DHCP server can use the identification, e.g., the DUID, as a key to identify an Infrastructure Management Services (IMS) uniform resource identifier (URI) for the cell site node. The identification of the IMS URI validates the call site node as authentic. If the key cannot identify the IMS URI, the call site node cannot be validated as authentic.

After the performance 908 of the security validation and validation of the cell site node, the DHCP server can transmit 910 an advertising (ADV) message to the cell site node. The ADV message can include the enterprise number, a nonce, an IP address (e.g., an IPV6 address) for the cell site node to use, and a lifetime of the use.

The cell site node receives the ADV message and, in reply, transmits 912 a second request to the DHCP server. The second request can include the vendor certificate installed on the cell site node, the nonce signed, a signed cloud (e.g., gcloud (Google Cloud) or other cloud) identification (which can be the cell site node product serial number), the identification of the cell site node, and the IP address.

The DHCP server receives the second request and, in reply, transmits 914 a reply to the DHCP server. The reply can include information that the cell site node may later use to allow the cell site node to communicate on the cellular network. As shown in FIG. 9, the information can include a Certificate Authority (CA) root certificate, a CA server Fully Qualified Domain Name (FQDN), and the IMS URI.

Figure 10:
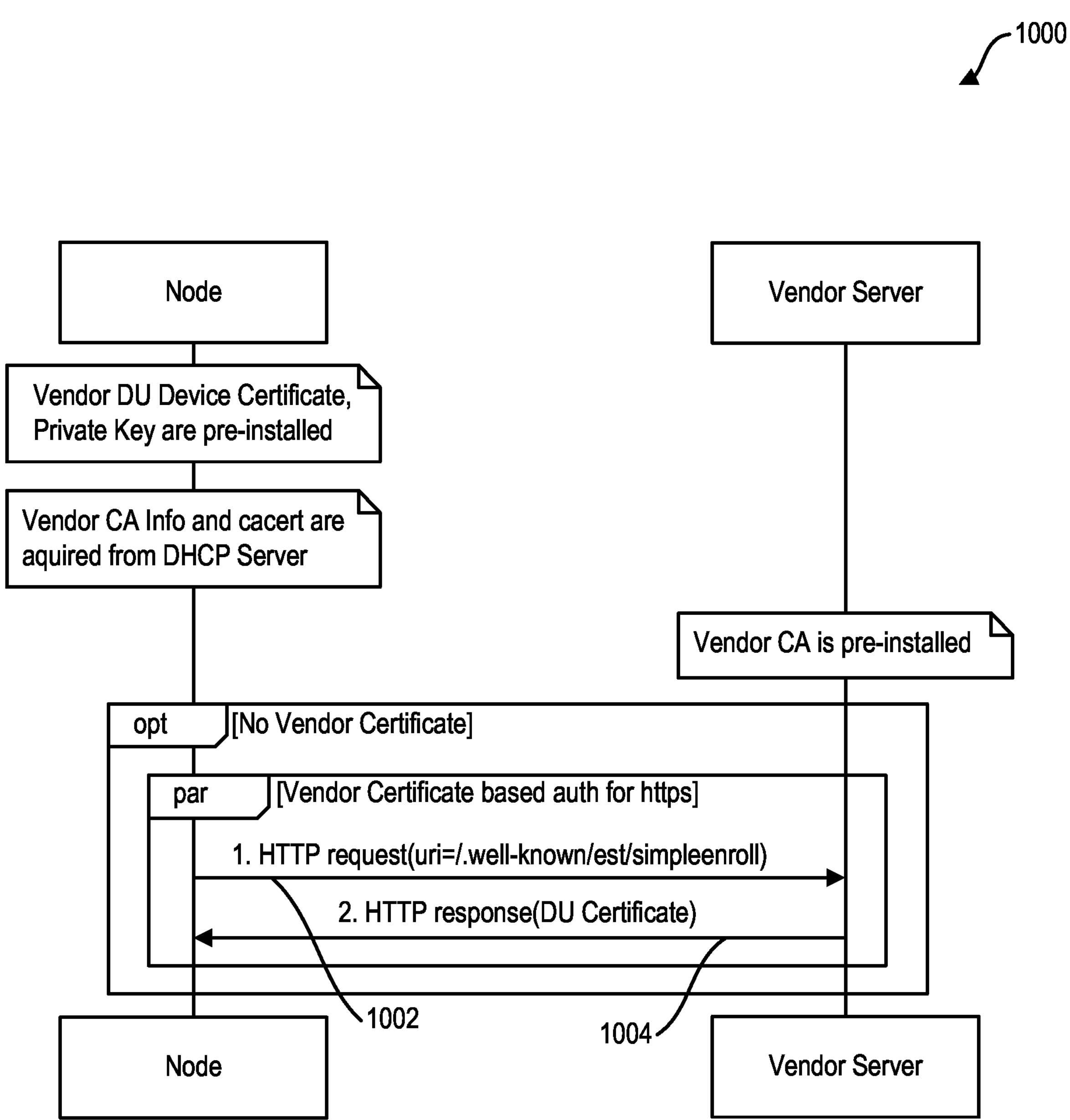
FIG. 10 illustrates an exemplary process for the cell site node acquiring an operator certificate in the process for cell site node management of FIG. 8, according to some implementations of the current subject matter.

In some instances, the cell site node may not have the vendor certificate, also referred to herein as an "operator certificate," pre-installed thereon and thus may not be able to transmit 912 to the DHCP server in the second request without first acquiring the vendor certificate from a vendor server. FIG. 10 illustrates an exemplary process 1000 for the cell site node acquiring the operator certificate, according to some implementations of the current subject matter. FIG. 10 illustrates communications between the cell site node and the vendor server. The communications between the cell site node and the vendor server can be secure, such as by using encryption, as will be appreciated by those skilled in the art. As shown in FIG. 10, the first certificate (shown in FIG. 10 as Vendor DU Device Certificate and Private Key) can be pre-installed on the cell site node, e.g., installed 702 in the process 700 of FIG. 7. As also shown in FIG. 10, the FQDN and IMS URL (shown in FIG. 10 as Vendor CA Info) and the CA root certificate (shown in FIG. 10 as cacert) can be acquired from the DHCP server, e.g., in the process 900 of FIG. 9. As further shown in FIG. 10, the vendor certificate can be pre-installed on the vendor server. The vendor certificate can be pre-installed on the vendor server during manufacturing or can be installed thereon at another time prior to commencement of the operator certificate acquisition process 1000, if not also prior to commencement of the cell site node management process 800.

The operator certificate acquisition process 1000 can include the cell site note transmitting 1002 a vendor certificate request to the vendor server. The FQDN and IMS URL that the cell site node received from the DHCP server can allow the cell site node to know where to direct the vendor certificate request to the vendor server. As shown in FIG. 10, the vendor certificate request can be in the form of an HTTP request. The vendor server receives the vendor certificate request and, in reply, transmits 1004 the vendor certificate to the cell site node.

If the cell site node does not receive the vendor certificate from the vendor server in the operator certificate acquisition process 1000, an error handling process may be performed. The error handling process can address the non-receipt of the vendor certificate according to the cell site operator's traditional error handling protocol, such as by the cell site node re-attempting to contact the vendor server or rebooting the cell site node a predetermined number of times (e.g., one time, two times, etc.) within a predetermined amount of time (e.g., thirty seconds, one minutes, etc.) before finalizing that the vendor certificate cannot be acquired from the vendor server. The vendor certificate not being able to be acquired from the vendor server may automatically trigger an alarm, such as transmission of an email, transmission of an email, an audible sound, a visible warning light, etc., that notifies appropriate personnel that manual intervention may be required to address the problem.

In some instances, the vendor server may transmit an expired vendor certificate to the cell site node when performing 802 the cell site node verification, e.g., in the transmission 912 of the second request of FIG. 9. In such instances, the operator certificate acquisition process 1000 of FIG. 10 can be performed so the cell site node can receive an unexpired vendor certificate from the vendor server.

Referring again to FIG. 8, if the cell site node is verified, the cell site node management process 800 can include establishing 804 a transport layer security (TLS) connection between the cell site node and a central server, e.g., a server of a central management system such as an SMO, e.g., SMO 604 of FIG. 6, etc. In general, establishing 804 the TLS connection between the cell site node and the central server can allow for secure communications between the cell site node and the central server. The TLS connection can be established 804 in accordance with the TLS protocol, as will be appreciated by those skilled in the art.

The cell site node management process 800 can include registering 806 the cell site node with the cellular network. In general, cell site registration can include the cell site node registering itself with the central server to register itself with the cellular network, thereby allowing the cell site node to communicate on the cellular network.

Figure 11:
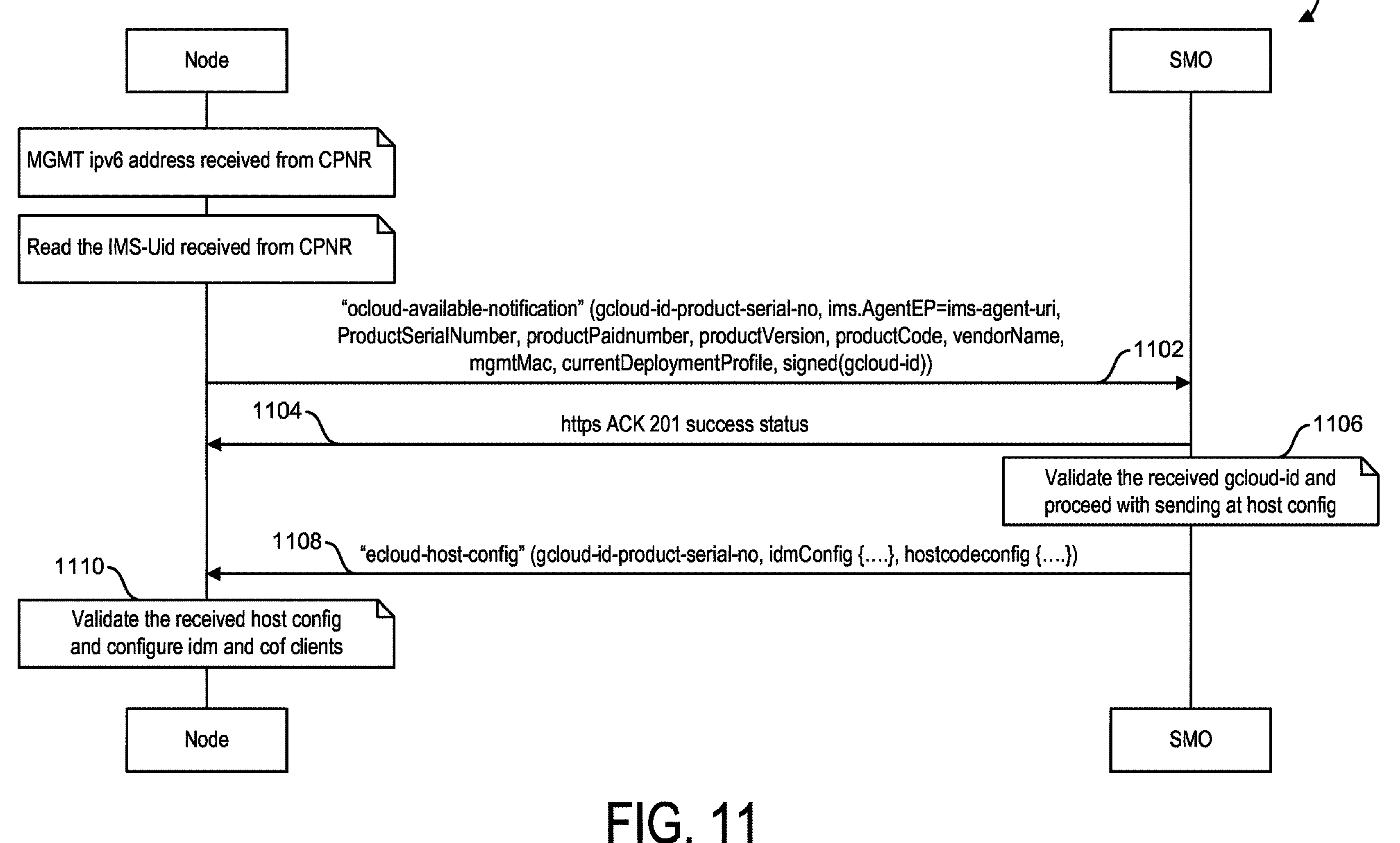
FIG. 11 illustrates an exemplary process for registering the cell site node with a cellular network in the process for cell site node management of FIG. 8, according to some implementations of the current subject matter.

FIG. 11 illustrates an exemplary process 1100 for registering 806 the cell site node with the cellular network, according to some implementations of the current subject matter. FIG. 11 illustrates communications between the cell site node and the central server, which is shown as an SMO in FIG. 11. The communications between the cell site node and the central server can be secure, such as by using encryption, as will be appreciated by those skilled in the art, such as by using the TLS connection established 804 between the cell site node and the central server.

As shown in FIG. 11, before the cell site registration process 1100 begins, the cell site node has received an IP address, e.g., in the ADV message transmitted 910 from the DHCP server to the cell site node in the cell site node verification process 900, and has received an IMS URI, e.g., in the reply transmitted 914 from the DHCP server to the cell site node in the cell site node verification process 900.

The cell site registration process 1100 can include the cell site node transmitting 1102 registration information to the central server. The registration information can uniquely identify the cell site node, which may allow the central server to register the cell site node as a unique node. As shown in FIG. 11, the registration information can include the serial number of the cell site node, which can uniquely identify the cell site node. The registration information can include additional information to facilitate registration of the cell site node. As also shown in FIG. 11, the registration information can include the serial number of the cell site node, the IMS URI, a part number of the cell site node, a version of the cell site node, a code of the cell site node, a vendor of the cell site node, an MGMT media access account (MAC) address of the cell site node, a current deployment profile of the cell site node, and a site ID identifying the cell site at which the cell site node is located. The site ID can, for example, include global positioning satellite (GPS) data, e.g., latitude and longitude coordinates of the cell site. In some instances, GPS data may be unavailable or may not be locked, in which case the site ID can be set to "invalid.

The central server receives the registration information and, in reply, transmits 1104 to the cell site node an acknowledgement that the registration information was received successfully. Also in response to receiving the registration information, the central server validates 1106 the serial number of the cell site node. The validation 1106 can be performed in a variety of ways, as will be appreciated by those skilled in the art, such as by using a pre-stored lookup table including a list of valid device serial numbers.

In response to the cell site node being validated, the central server transmits 1108 configuration information to the cell site node. In general, the configuration information indicating a configuration for the cell site node for communication in the wireless communication system, e.g., the wireless communication system that includes the SMO.

The cell site node receives the configuration information and, in reply, validates 1110 the configuration information, e.g., in accordance with the secure communication protocol being used for secure communication between the cell site node and the central server. In response to validating the configuration information, the cell site node configures itself, using the configuration information, for communication in the wireless communication system. The cell site node can therefore automatically configure itself for communication in the wireless communication system. As shown in FIG. 11, the configuration information can include identity management (IdM) configuration information. The cell site node configuring itself using the configuration information can thus include the cell site node configuring itself as an IdM client, using the IdM configuration information, to allow the cell site node to use IdM services in the wireless communication system that includes the central server. As also shown in FIG. 11, the configuration information can include open bootstrap framework (OBF) configuration information. The cell site node configuring itself using the configuration information can thus include the cell site node configuring itself as an OBF client, using the OBF configuration information, to provide for secure bootstrapping of keys.

In response to the cell site node not being validated, an error handling process may be performed. The error handling process can address the inability to validate the serial number of the cell site node according to the cell site operator's traditional error handling protocol, such as by re-attempting the validation a predetermined number of times (e.g., one time, two times, etc.) within a predetermined amount of time (e.g., thirty seconds, one minutes, etc.) and/or by rebooting the cell site node a predetermined number of times (e.g., one time, two times, etc.) within a predetermined amount of time (e.g., thirty seconds, one minutes, etc.) before finalizing the non-validation determination. The non-validation determination may automatically trigger an alarm, such as transmission of an email, transmission of an email, an audible sound, a visible warning light, etc., that notifies appropriate personnel that manual intervention may be required to address the problem.

Referring again to FIG. 8, if the cell site node is registered, the cell site node management process 800 can include managing 808 cell site node infrastructure. In general, managing 808 cell site node infrastructure can allow the cell site node to run cloud infrastructure thereon and allow for current versions of time sensitive and/or real time RAN applications to be run at the cell site node.

The cell site node can have software installed therein, e.g., stored in a memory the cell site node, as part of the cell site node's manufacturing process. The cell site node can also have software inventory information installed thereon that include a manifest listing versions of each one or more software modules of the software. Each of the software modules can correspond to a RAN application. By the time the cell site node has been delivered to the cell site, set up as needed, and powered on, one or more of the software modules may be outdated and need upgrade to a newer version (or downgraded to a older version) and/or one or more new software modules may be available. The management 808 of the cell site node infrastructure may allow for software installed on the cell site node, e.g., software modules installed on the cell site node, to be current.

Figure 12A:
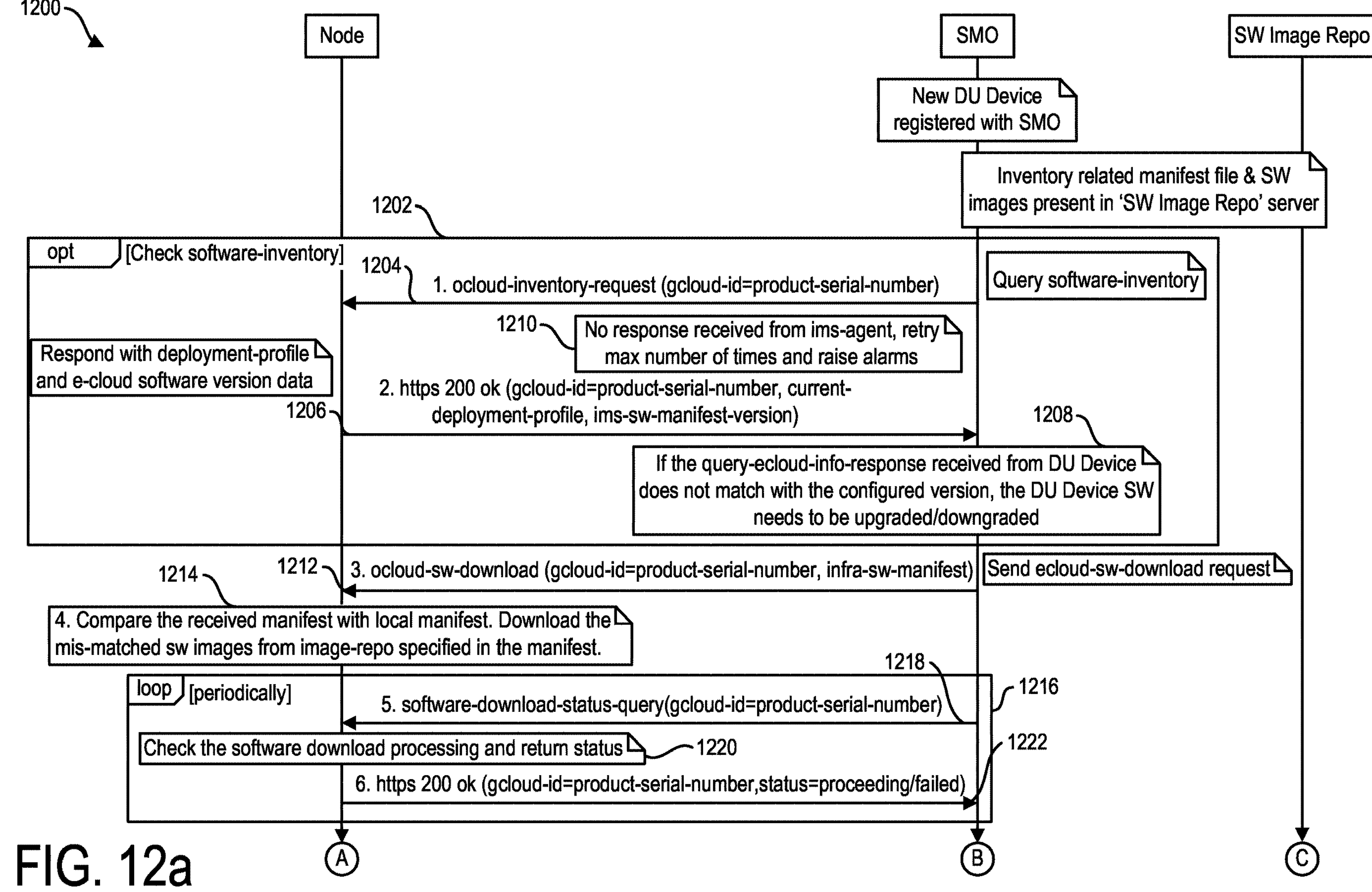
FIG. 12*a* illustrates a portion of an exemplary process for managing cell site node infrastructure in the process for cell site node management of FIG. 8, according to some implementations of the current subject matter.
Figure 12B:
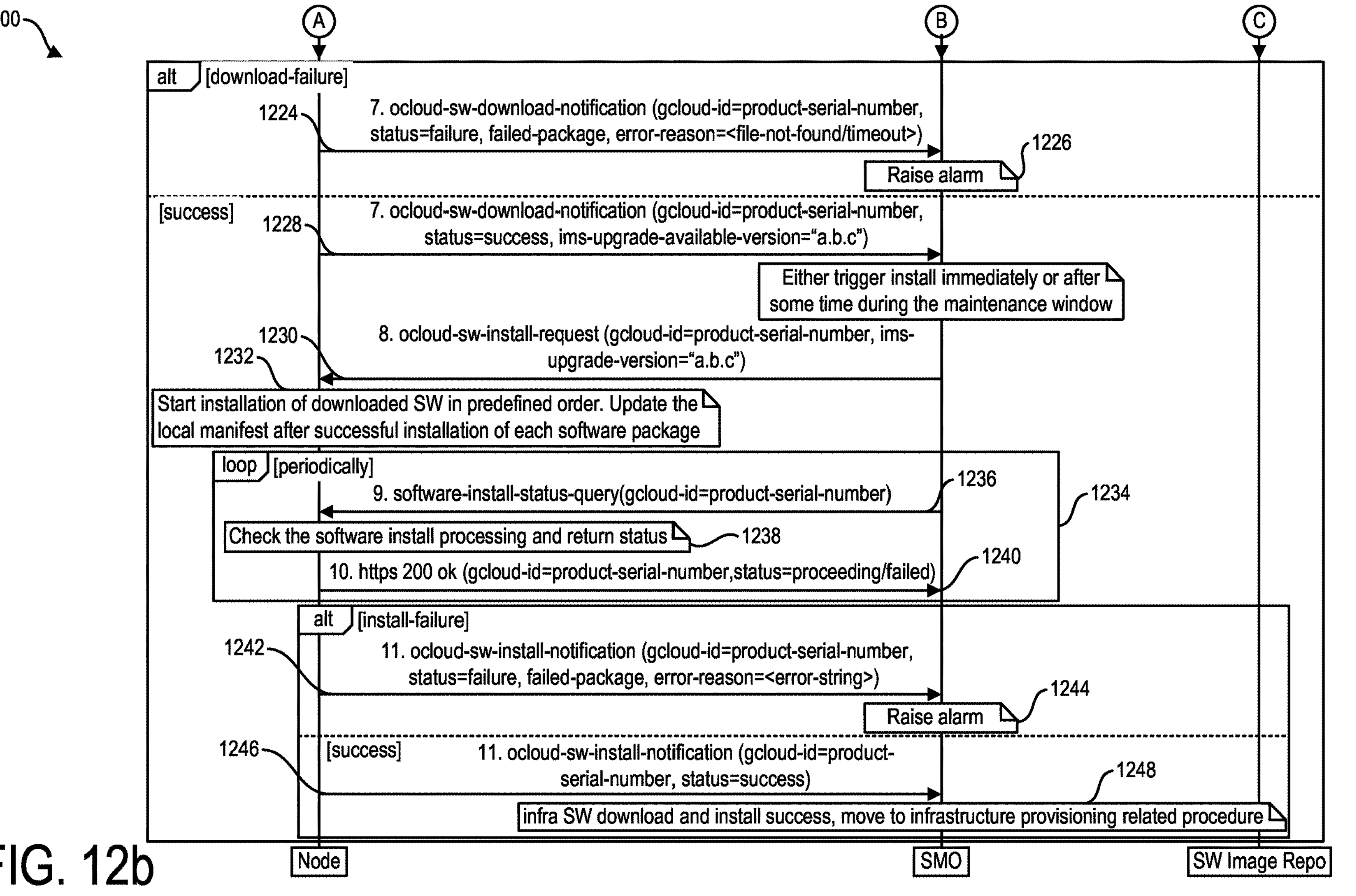
FIG. 12*b* illustrates another portion of the process for managing cell site node infrastructure of FIG. 12*a:*

FIGS. 12*a* and 12*b* illustrate an exemplary process 1200 for managing 808 cell site node infrastructure, according to some implementations of the current subject matter. FIGS. 12*a* and 12*b* illustrate communications between the cell site node and the central server, which is shown as an SMO, e.g., the SMO of FIG. 11. The communications between the cell site node and the central server can be secure, such as by using encryption, as will be appreciated by those skilled in the art, such as by using the TLS connection established 804 between the cell site node and the central server. FIGS. 12*a* and 12*b* also show a software (SW) image repository (repo) server of the central management system that includes the SMO. The SMO and the SW image repo server are thus communicatively coupled. The SW image repo server stores an inventory manifest file, e.g., in a memory of the SW image repo server, listing software modules and their current versions and stores software images, e.g., in a memory of the SW image repo server, of the current versions of the software modules. The inventory manifest file and the SW images are available to the SMO for use as discussed further below.

As shown in FIG. 12*a*, the management process 1200 can include, after the cell site node has registered 806 with the central server, the central server checking 1202 the software inventory of the cell site node. In general, the checking 1202 of the cell site node's software inventory may allow the central server to determine whether or not the software installed on the cell site node is current, e.g., the one or more software modules installed on the cell site node are each current.

The central server checking 1202 the software inventory of the cell site node can include the central server transmitting 1204 an inventory query request to the cell site node. The cell site node receives the inventory query request and, in reply, can transmit 1206 software inventory information to the central server. As shown in FIG. 12*a*, the software inventory information can include a current deployment profile of the cell site node and can include the manifest listing versions of each of the cell site node's one or more software modules. As also shown in FIG. 12*a*, the software inventory information can be transmitted 1206 with the serial number of the cell site node and the part number of the cell site node so that the central server can uniquely associate the software inventory information with the cell site node.

The central server receives the software inventory information and can determine whether the cell site node's software, e.g., one or more of the cell site node's software modules, needs to be upgraded/downgraded. The determination can include the central server comparing the software inventory information, e.g., the manifest, received from the cell site node with the inventory manifest file. If the software inventory information, e.g., the manifest, is determined to match the inventory manifest file, then the software does not need to be upgraded/downgraded because it is current. If the software inventory information, e.g., the manifest, is determined 1208 to not match the inventory manifest file, then the software needs to be upgraded/downgraded because it is not current. In particular, the one or more software modules that do not match the inventory manifest file needs to be upgraded/downgraded and the management process 1200 continues.

If the central server does not receive a response to the inventory query request from the cell site node, an error handling process can be performed 1210. The error handling process can address the non-receipt of a reply according to the cell site operator's traditional error handling protocol, such as by the central server re-attempting to contact the cell site node a predetermined number of times (e.g., one time, two times, etc.) within a predetermined amount of time (e.g., thirty seconds, one minutes, etc.) before finalizing that the cell site node is being non-responsive to the inventory query request. The cell site node being non-responsive to the inventory query request may automatically trigger an alarm, such as transmission of an email, transmission of an email, an audible sound, a visible warning light, etc., that notifies appropriate personnel that manual intervention may be required to address the problem.

In some implementations, the central server checking 1202 the software inventory of the cell site node can be omitted from the management process 1200. Instead, the management process 1200 may begin with the central server transmitting 1212 a download instruction to the cell site node as discussed further below. Omitting the checking 1202 of the software inventory of the cell site node may conserve network bandwidth and processing resources of the central server and the cell node site. Versions of one or more software modules may be frequently changed (e.g., to address identified bugs, to improve functionality, to account for new functionality, to take advantage of improved technology in one or more aspects of the wireless communications system, etc.), so omitting the checking 1202 of the software inventory of the cell site node may in at least some instances be omitting unnecessary transmissions 1204, 1206 and related processing at the cell site node and central server since it may be more likely than not that the management process 1200 will need to continue.

Whether or not the management process 1200 includes the checking 1202 of the software inventory of the cell site node, the management process 1200 can include the central server transmitting 1212 a download instruction to the cell site node. The download instruction can include the inventory manifest file. The download information can also include can include unique identification information uniquely identifying the cell site node. As shown in FIG. 12*a*, the information uniquely identifying the cell site node can include the serial number of the cell site node, which the central server may have previously received from the cell site node in the transmission 1120 of registration information to the central server.

The cell site node receives the download instruction and, in reply, can verify that the download instruction is an authentic instruction for the cell site node by verifying that the received unique identification information is uniquely identifying the cell site node. If the download instruction is an authentic instruction for the cell site node, the cell site node can compare 1214 the received inventory management file with the software inventory information stored at the cell site node to determine whether the received inventory management file matches the software inventory information. If the software inventory information, e.g., the manifest thereof, is determined to match the inventory manifest file, then the software at the cell site node does not need to be upgraded/downgraded because it is current and the management process 1200 can continue to a first loop process 1216. If the software inventory information, e.g., the manifest thereof, is determined to not match the inventory manifest file, then the software at the cell site node needs to be upgraded/downgraded because it is not current. In particular, the one or more software modules that do not match the inventory manifest file needs to be upgraded/downgraded and the management process 1200 continues with the cell site node downloading 1214 SW images from the central server, e.g., the SW images stored at the SW image repo server accessible to the central server, for the one or more software modules that were determined to not match the inventory manifest file. The management process 1200 can then continue to the first loop process 1216.

In general, the first loop process 1216 can allow the central server to monitor a response of the cell site node to the transmitted 1212 download instruction. The first loop process 1216 can include the central server transmitting 1218 a status query to the cell site node that queries a status of reply to the transmitted 1212 download instruction. As shown in FIG. 12*a*, the status query can include information uniquely identifying the cell site node including the serial number of the cell site node, which the central server may have previously received from the cell site node in the transmission 1120 of registration information to the central server.

The cell site node receives the status query and, in reply, can verify that the status query is an authentic query to the cell site node by verifying that the received unique identification information is uniquely identifying the cell site node. If the status query is an authentic query to the cell site node, the cell site node can determine 1220 a status of response to the transmitted 1212 download instruction and can transmit 1222 the determined status to the central server. The determined 1220 status can be that no software upgrade/downgrade is necessary, the determined 1220 status can be that the software upgrade/downgrade can successfully proceed, or the determined 1220 status can be that the software upgrade/downgrade has failed.

The first loop process 1216 of the management process 1200 can be performed periodically. The periodic performance of the first loop process 1216 can be according to a predetermined time schedule preset at the central server, e.g., with the central server transmitting 1218 the status query according to the predetermined time schedule as long as the cell site node keeps replying that the software upgrade/downgrade is successfully proceeding.

If the software upgrade/downgrade was determined 1220 to have failed because the needed one or more SW images could not be downloaded from the central server, the cell site node can transmit 1224 a download failure notification to the central server. The download failure notification can include an indication of the failure status, an identification of the one or more SW images unable to be downloaded, unique identification information uniquely identifying the cell site node including the serial number of the cell site node, and a reason for the failure (e.g., file not found or timeout).

The central server receives the download failure notification and, in reply, can verify that the download failure notification is an authentic notification from the cell site node by verifying that the received unique identification information is uniquely identifying the cell site node. If the download failure notification is an authentic notification from the cell site node, an error handling process can be performed 1226. The error handling process can address the failure according to the cell site operator's traditional error handling protocol, such as by the central server attempting to transmit the one or more SW images unable to be downloaded as identified in the notification a predetermined number of times (e.g., one time, two times, etc.) within a predetermined amount of time (e.g., thirty seconds, one minutes, etc.) before finalizing that failure occurred. The failure may automatically trigger an alarm, such as transmission of an email, transmission of an email, an audible sound, a visible warning light, etc., that notifies appropriate personnel that manual intervention may be required to address the problem.

If the software upgrade/downgrade was determined 1220 to be able to successfully proceed, the cell site node can transmit 1228 a download success notification to the central server. The download success notification can include an indication of the success status, an identification of the one or more SW images needed for upgrade/downgrade, and unique identification information uniquely identifying the cell site node including the serial number of the cell site node.

The central server receives the download success notification and, in reply, can verify that the download success notification is an authentic notification from the cell site node by verifying that the received unique identification information is uniquely identifying the cell site node. If the download success notification is an authentic notification from the cell site node, the central server can either immediately transmit 1230 an installation request to the cell site node or can transmit 1239 the installation request at a later time, such as during a scheduled maintenance window of the cell site node. Transmitting 1230 the installation request immediately may help the cell site node have current software installed thereon as soon as possible. Transmitting 1230 the installation request during the scheduled maintenance window may help prevent the cell site node from experiencing any excess downtime due to the software upgrade/downgrade. Whether transmitted 1230 immediately or at a later time, the installation request can include unique identification information is uniquely identifying the cell site node including the serial number of the cell site node and can include the one or more SW images identified in the download success notification.

The cell site node receives the installation request and, in reply, can verify that the installation request is an authentic request from the central server by verifying that the received unique identification information is uniquely identifying the cell site node. If the installation request is an authentic notification from the cell site node, the cell site node can begin 1232 installation of the received one or more SW images. The received one or more SW images can be installed in an order predefined in the installation request, as indicated in FIG. 12*b* by the installation request providing an alphabetical installation order of three SW images as a, b, and c. In response to a received SW image being successfully installed, the cell site node can update 1232 its software inventory information to reflect the current version of the SW module that was updated.

After the transmission 1230 of the installation request, the management process 1200 can include performance of a second loop process 1234. In general, the second loop process 1234 can allow the central server to monitor a response of the cell site node to the transmitted 1230 installation request. The second loop process 1234 can include the central server transmitting 1236 a status query to the cell site node that queries a status of reply to the transmitted 1230 installation request. As shown in FIG. 12*b*, the installation request can include information uniquely identifying the cell site node including the serial number of the cell site node, which the central server may have previously received from the cell site node in the transmission 1228 of the download success notification to the central server.

The cell site node receives the status query and, in reply, can verify that the status query is an authentic query to the cell site node by verifying that the received unique identification information is uniquely identifying the cell site node. If the status query is an authentic query to the cell site node, the cell site node can determine 1238 a status of response to the transmitted 1230 installation request and can transmit 1240 the determined status to the central server. The determined 1238 status can be that the software installation can successfully proceed, or the determined 1238 status can be that the software installation has failed.

The second loop process 1234 of the management process 1200 can be performed periodically. The periodic performance of the second loop process 1234 can be according to a predetermined time schedule preset at the central server, e.g., with the central server transmitting 1236 the status query according to the predetermined time schedule as long as the cell site node keeps replying that the software installation is successfully proceeding.

If the software installation was determined 1238 to have failed because the received one or more SW images could not be installed at the cell site node, the cell site node can transmit 1242 an installation failure notification to the central server. The installation failure notification can include an indication of the failure status, an identification of the one or more SW images unable to be installed, unique identification information uniquely identifying the cell site node including the serial number of the cell site node, and a reason for the failure (e.g., an error string generated during the installation attempt).

The cell site node can continue using the previously installed version of each software module that failed to install. However, if the software module that failed to install is a critical software module, e.g., a software module for a critical infrastructure function, the cell site node can be rebooted in an attempt to recover from the condition causing the failure such that, after the reboot, the one or more SW images that failed to install can be successfully installed. One example of a critical infrastructure function is a Juniper Cloud-Native Router (JCNR). Another example of a critical infrastructure function is a VAULT function.

The central server receives the installation failure notification and, in reply, can verify that the installation failure notification is an authentic notification from the cell site node by verifying that the received unique identification information is uniquely identifying the cell site node. If the installation failure notification is an authentic notification from the cell site node, an error handling process can be performed 1244. The error handling process can address the failure according to the cell site operator's traditional error handling protocol, such as by an alarm being automatically triggered such as transmission of an email, transmission of an email, an audible sound, a visible warning light, etc., that notifies appropriate personnel that manual intervention may be required to address the problem.

If the software installation was determined 1238 to be able to successfully proceed, the cell site node can transmit 1246 an installation success notification to the central server. The installation success notification can include an indication of the success status, an identification of the one or more SW images installed, and unique identification information uniquely identifying the cell site node including the serial number of the cell site node.

The central server receives the installation success notification and, in reply, can verify that the installation success notification is an authentic notification from the cell site node by verifying that the received unique identification information is uniquely identifying the cell site node. If the installation success notification is an authentic notification from the cell site node, the central server can consider the installation a success and the cell site node management process 800 can continue.

Referring again to FIG. 8, after the management 808 of cell site node infrastructure, the cell site node management process 800 can include provisioning 810 of the cell site infrastructure. In general, provisioning 810 of the cell site infrastructure can allow for the cell site infrastructure to be configured properly for running at the cell site node for the cell site node to properly communicate on the wireless communication system.

Figure 13:
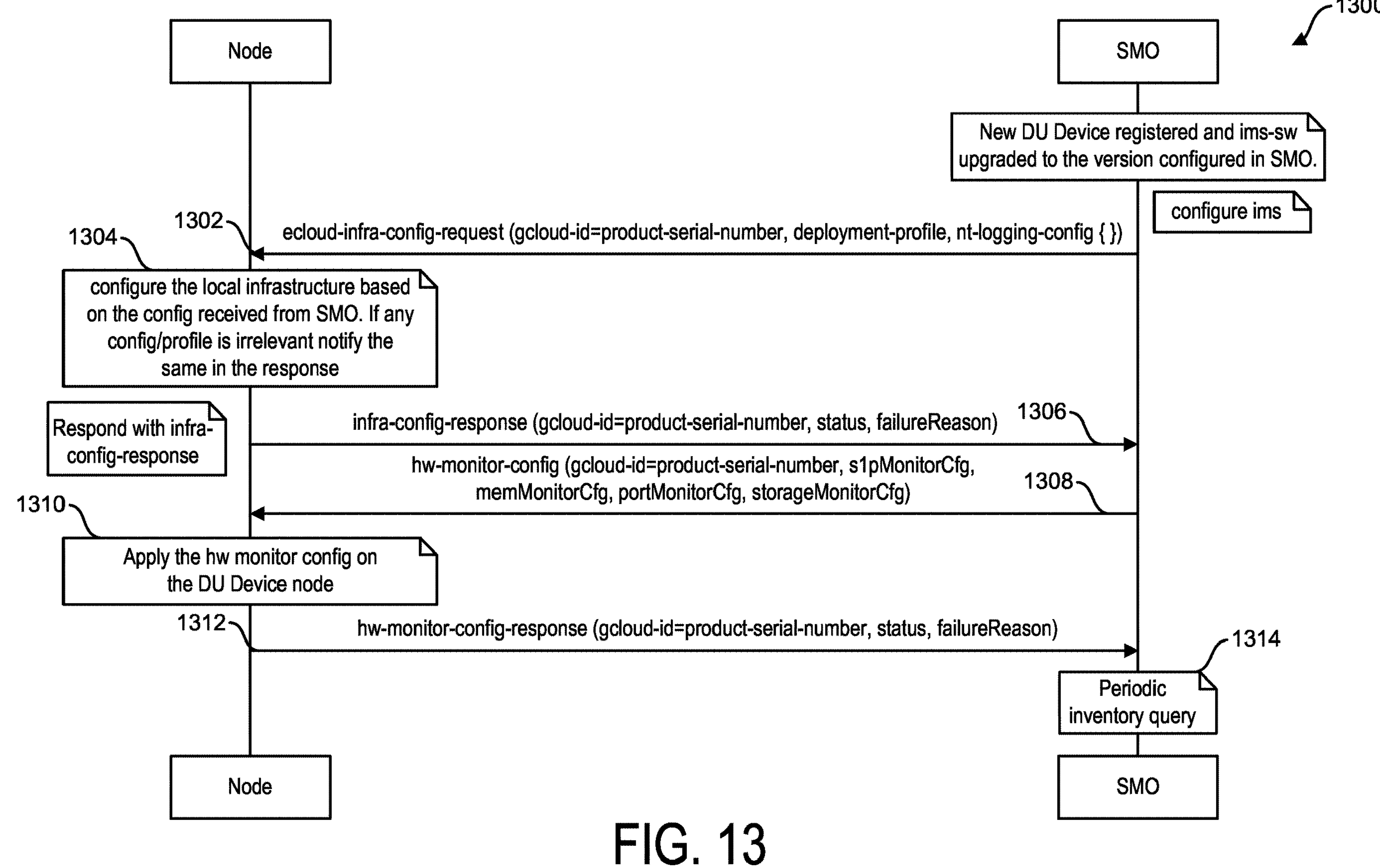
FIG. 13 illustrates an exemplary process 1300 for provisioning of the cell site infrastructure in the process for cell site node management of FIG. 8, according to some implementations of the current subject matter.

FIG. 13 illustrates an exemplary process 1300 for provisioning 810 of the cell site infrastructure, according to some implementations of the current subject matter. FIG. 13 illustrates communications between the cell site node and the central server, which is shown as an SMO, e.g., the SMO of FIGS. 11, 12*a*, and 12*b*. The communications between the cell site node and the central server can be secure, such as by using encryption, as will be appreciated by those skilled in the art, such as by using the TLS connection established 804 between the cell site node and the central server.

As shown in FIG. 13, the provisioning process 1300 can include, after the cell site node has registered 806 with the central server and after the cell site node's infrastructure has been managed 808, the central server transmitting 1302 an infrastructure configuration request to the cell site node. As shown in FIG. 13, the infrastructure configuration request can include information uniquely identifying the cell site node including the serial number of the cell site node, which the central server may have previously received from the cell site node (e.g., in the transmission 1120 of the of registration information to the central server and/or during the management process 1200), a deployment profile for the cell site node, and infrastructure configuration information.

The cell site node receives the infrastructure configuration request and, in reply, can verify that the infrastructure configuration request is an authentic request for the cell site node by verifying that the received unique identification information is uniquely identifying the cell site node. If the infrastructure configuration request is an authentic request for the cell site node, the cell site node can configure 1304 the cell site node's infrastructure using the received infrastructure configuration information in accordance with the received deployment profile, and the cell site node can transmit 1306 an infrastructure configuration response to the central server. The infrastructure configuration response can include information uniquely identifying the cell site node including the serial number of the cell site node, a status of the infrastructure configuration, and if the infrastructure configuration has failed, a reason for the failure. If any of the received deployment profile and the received infrastructure configuration information is irrelevant to the cell site node, the infrastructure configuration response can include information indicating the irrelevant deployment profile and/or infrastructure configuration information.

The central server receives the infrastructure configuration response and, in reply, can verify that the infrastructure configuration response is an authentic response from the cell site node by verifying that the received unique identification information is uniquely identifying the cell site node. If the infrastructure configuration response is an authentic response from the cell site node, the central server can transmit 1308 hardware monitoring configuration information to the cell site node. The hardware monitoring configuration information can include information uniquely identifying the cell site node including the serial number of the cell site node and can include software configuration files to be applied on the cell site node. As shown in FIG. 13, examples of the hardware monitoring configuration information include a small form-factor pluggable (SFP) monitor configured to monitor SFP at the cell site node, a memory monitor configured to monitor memory at the cell site node, a power monitor configured to monitor at least one port at the cell site node, and a storage monitor configured to monitor storage available at the cell site node.

The cell site node receives the hardware monitoring configuration information and, in reply, can verify that the hardware monitoring configuration information is authentic information for the cell site node by verifying that the received unique identification information is uniquely identifying the cell site node. If the hardware monitoring configuration information is authentic information for the cell site node, the cell site node can apply 1310 the hardware monitoring configuration information to the cell site node, and the cell site node can transmit 1312 a hardware monitor configuration response to the central server. The hardware monitor configuration response can include information uniquely identifying the cell site node including the serial number of the cell site node, a status of the hardware monitor configuration, and if the hardware monitor configuration has failed, a reason for the failure.

The central server receives the hardware monitor configuration response and, in reply, can verify that the hardware monitor configuration response is an authentic response from the cell site node by verifying that the received unique identification information is uniquely identifying the cell site node. If the hardware monitor configuration response is an authentic response from the cell site node, the central server can perform a periodic inventory query, e.g., can manage 808 the cell site node infrastructure as discussed above.

Figure 14:
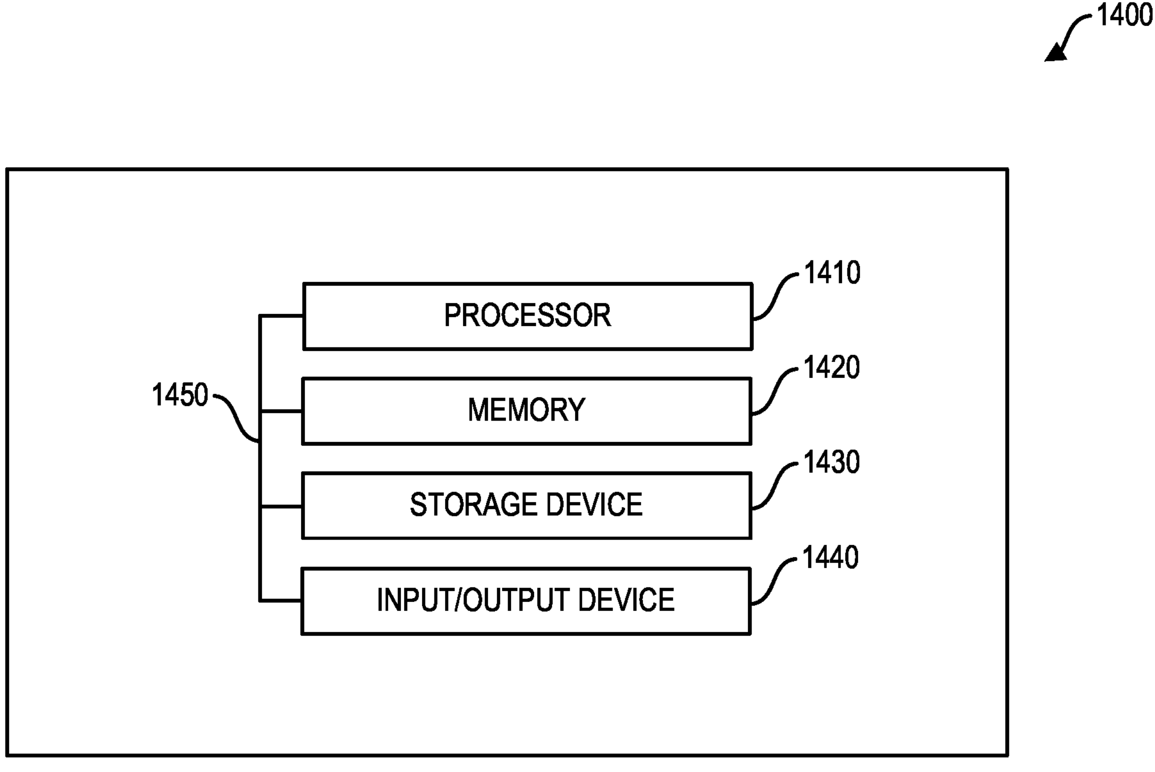
FIG. 14 illustrates an exemplary system, according to some implementations of the current subject matter.

In some implementations, the current subject matter can be configured to be implemented in a system 1400, as shown in FIG. 14. The system 1400 can include one or more of a processor 1410, a memory 1420, a storage device 1430, and an input/output device 1440. Each of the components 1410, 1420, 1430 and 1440 can be interconnected using a system bus 1450. The processor 1410 can be configured to process instructions for execution within the system 600. In some implementations, the processor 1410 can be a single-threaded processor. In alternate implementations, the processor 1410 can be a multi-threaded processor. The processor 1410 can be further configured to process instructions stored in the memory 1420 or on the storage device 1430, including receiving or sending information through the input/output device 1440. The memory 1420 can store information within the system 1400. In some implementations, the memory 1420 can be a computer-readable medium. In alternate implementations, the memory 1420 can be a volatile memory unit. In yet some implementations, the memory 1420 can be a non-volatile memory unit. The storage device 1430 can be capable of providing mass storage for the system 1400. In some implementations, the storage device 1430 can be a computer-readable medium. In alternate implementations, the storage device 1430 can be a floppy disk device, a hard disk device, an optical disk device, a tape device, non-volatile solid state memory, or any other type of storage device. The input/output device 1440 can be configured to provide input/output operations for the system 1400. In some implementations, the input/output device 1440 can include a keyboard and/or pointing device. In alternate implementations, the input/output device 1440 can include a display unit for displaying graphical user interfaces.

Figure 15:
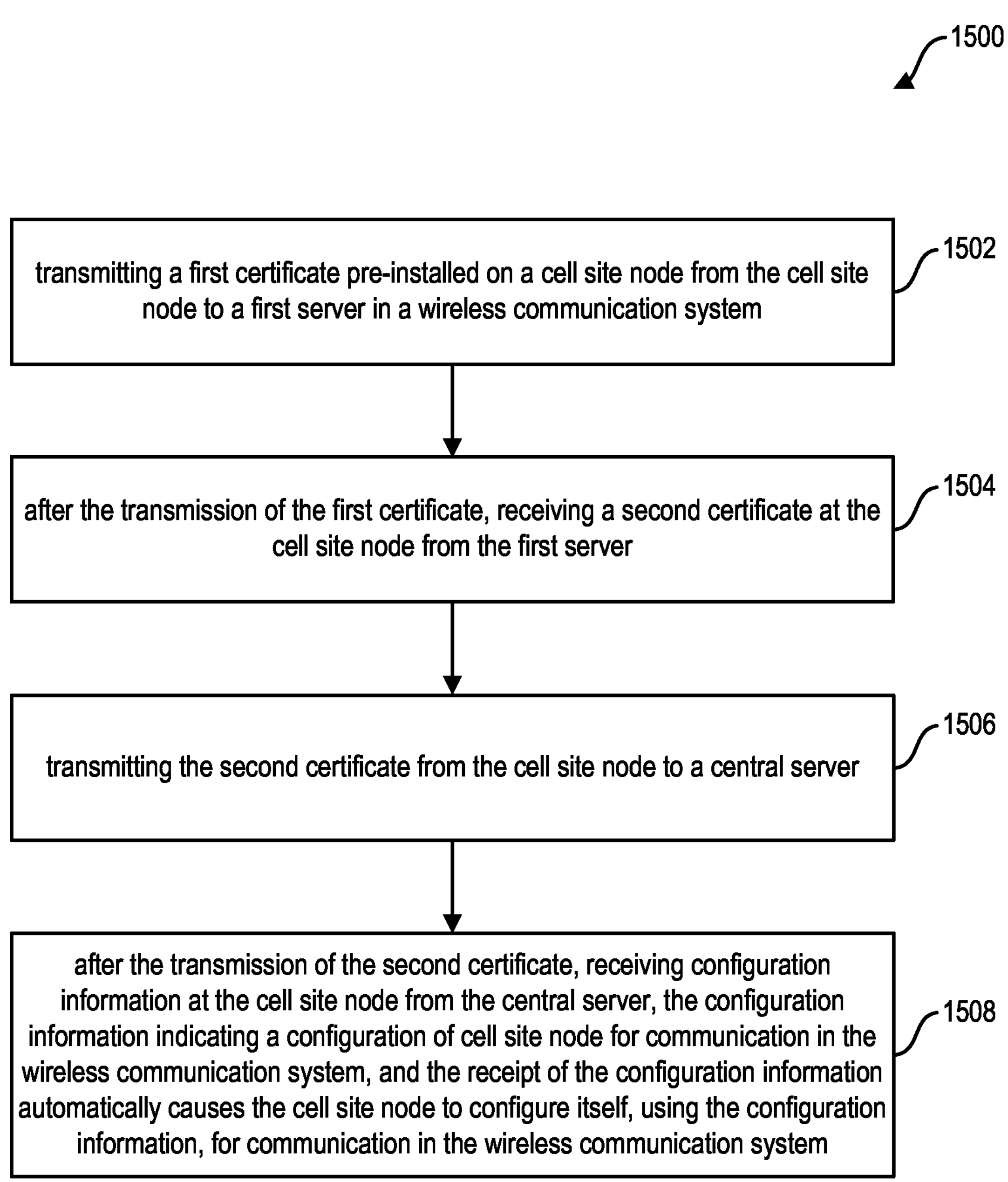
FIG. 15 illustrates an exemplary method, according to some implementations of the current subject matter.

FIG. 15 illustrates an exemplary method 1500 for managing cell sites in a radio access network, according to some implementations of the current subject matter. The method 1500 may be performed, for example, using implementations shown in and described with respect to FIGS. 6-13.

The method 1500 includes transmitting 1502 a first certificate (e.g., a vendor certificate) pre-installed on a cell site node from the cell site node (e.g., a distributed unit such as DU 304 of FIG. 3, DUs 508, 510 of FIGS. 5*a*-5*c*, DUs 602*a*, 602*b*, 602*n* of FIG. 6, etc.) to a first server (e.g., the DHCP server of FIG. 9) in a wireless communication system. The method 1500 also includes, after the transmission 1502 of the first certificate, receiving 1504 a second certificate (e.g., a CA root certificate) at the cell site node from the first server. The method 1500 also includes transmitting 1506 the second certificate from the cell site node to a central server (e.g., a server of a central management system such as an SMO, e.g., SMO 604 of FIG. 6, SMO of FIGS. 11-13, etc.) and, after the transmission of the second certificate, receiving 1508 configuration information at the cell site node from the central server. The configuration information indicates a configuration for the cell site node for communication in the wireless communication system. The receipt of the configuration information automatically causes the cell site node to configure itself, using the configuration information, for communication in the wireless communication system.

In some implementations, the current subject matter can include one or more of the following optional features.

In some implementations, the method may also include, after the cell site node configures itself, transmitting software inventory information from the cell site node to the central server, and installing updated software on the cell site node in response to the central server determining, based on the software inventory information, that software installed on the cell site node is out of date. Further, the central server may be configured to trigger the installation of the updated software at any time after the cell site node configures itself; the cell site node may receive an installation instruction from the central server in response to the central server determining, based on the software inventory information, that software installed on the cell site node is out of date, and the installation instruction may cause the cell site node to automatically download the updated software that is installed on the cell site node; and/or the software inventory information may include a manifest listing versions of each one or more software modules required by the cell site node. Further, installing updated software on the cell site node may include downloading software for each of the one or more software modules from the central server and installing the downloaded software on the cell site node.

In some implementations, the cell site node may transmit the software inventory information from the cell site node to the central server to maintain current software inventory on the cell site node. Further, the software inventory information may include a manifest listing versions of each one or more software modules required by the cell site node; the method may also include, after the transmission of the software inventory information, receiving updated configuration information at the cell site node from the central server, the updated configuration information indicating an updated configuration for at least one software module identified in the software inventory information; and the receipt of the updated configuration information may automatically cause the cell site node to configure the at least one software module using the updated configuration information. Further, the cell site node transmitting the software inventory information may be triggered by the cell site node first registering with the central server.

In some implementations, the first server may transmit the second certificate to the cell site node after the first server validates the first certificate received from the cell site node, and the central server may transmit the configuration information to the cell site node after the central server validates the second certificate received from the cell site node.

In some implementations, the cell site node receiving the second certificate may automatically trigger the cell site node to transmit the second certificate from the cell site node to the central server.

In some implementations, an agent pre-installed on the cell site node may cause at least one of the transmission of the first certificate, the transmission of the second certificate, and the cell site node to configure itself using the configuration information.

In some implementations, the transmission of the first certificate may be triggered automatically by powering on the cell site node.

In some implementations, the central server may be configured to cause the configuration of the cell site node to be updated at any time after the cell site node configures itself.

In some implementations, the cell site node configuring itself may include the cell site node configuring itself to run cloud infrastructure locally on the cell site node.

In some implementations, the wireless communication system may include a radio access network (RAN).

In some implementations, the cell site node may be in communication with a base station in the wireless communication system. Further, the base station may include at least one of the following: an eNodeB base station, a gNodeB base station, a wireless base station, and any combination thereof. Further, the base station may be operating in at least one of the following communications systems: a long term evolution communications system, a new radio communications system, and any combination thereof.

In some implementations, the cell site node may be a distributed unit (DU).

In some implementations, the central server may be a server of a central management system.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order: as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:

transmitting a first certificate pre-installed on a cell site node in a wireless communication system from the cell site node to a first server providing verification that the cell site node is authorized to communicate in the wireless communication system, based on the first certificate;

receiving a second certificate at the cell site node from the first server in response to the transmitting the first certificate;

transmitting the second certificate from the cell site node to a central server, the central server being distinct from the first server, allowing the cell site node to communicate in the wireless communication system, based on the second certificate; and receiving configuration information at the cell site node from the central server, distinct from the first server, in response to the transmitting the second certificate, the configuration information indicating a configuration for the cell site node for executing communication in the wireless communication system;

wherein the receipt of the configuration information automatically causes the cell site node to configure itself, using the configuration information, for communication in the wireless communication system, and wherein the configuration information comprises at least one of: identity management (IdM) configuration information to allow the cell site node to configure itself as an IdM client and use IdM services in the wireless communication system; and open bootstrap framework (OBF) configuration information to allow the cell site node to configure itself as an OBF client to provide for secure bootstrapping of keys.

2. The method of claim 1, further comprising, after the cell site node configures itself, transmitting software inventory information from the cell site node to the central server; and installing updated software on the cell site node in response to the central server determining, based on the software inventory information, that software installed on the cell site node is out of date, wherein the installing the updated software comprises:

receiving, by the cell site node, a download instruction to download the updated software, in response to the central server determining, based on the software inventory information, that software installed on the cell site node is out of date;

comparing, by the cell site node, software information included in the received download instruction with the software inventory information; and downloading, by the cell site node, the updated software based on the comparing.

3. The method of claim 2, wherein the download instruction causes the cell site node to automatically download the updated software that is installed on the cell site node, based on the comparing.

4. The method of claim 2, wherein the central server is configured to trigger the installation of the updated software at any time after the cell site node configures itself.

5. The method of claim 1, wherein the cell site node transmits the software inventory information from the cell site node to the central server to maintain current software inventory on the cell site node.

6. The method of claim 5, wherein the software inventory information includes a manifest listing versions of each one or more software modules required by the cell site node;

the method further comprises, after the transmission of the software inventory information, receiving updated configuration information at the cell site node from the central server, the updated configuration information indicating an updated configuration for at least one software module identified in the software inventory information; and the receipt of the updated configuration information automatically causes the cell site node to configure the at least one software module using the updated configuration information.

7. The method of claim 1, wherein the first server transmits the second certificate to the cell site node after the first server validates the first certificate received from the cell site node; and the central server transmits the configuration information to the cell site node after the central server validates the second certificate received from the cell site node.

8. The method of claim 1, wherein the cell site node receiving the second certificate automatically triggers the cell site node to transmit the second certificate from the cell site node to the central server.

9. The method of claim 1, wherein an agent pre-installed on the cell site node causes at least one of the transmission of the first certificate, the transmission of the second certificate, and the cell site node to configure itself using the configuration information.

10. The method of claim 1, wherein the transmission of the first certificate is triggered automatically by powering on the cell site node.

11. The method of claim 1, wherein the central server is configured to cause the configuration of the cell site node to be updated at any time after the cell site node configures itself.

12. The method of claim 1, wherein the cell site node configuring itself comprises the cell site node configuring itself to run cloud infrastructure locally on the cell site node.

13. The method of claim 1, wherein the wireless communication system includes a radio access network (RAN).

14. The method of claim 1, wherein the cell site node is in communication with a base station in the wireless communication system.

15. The method of claim 14, wherein the base station includes at least one of the following: an eNodeB base station, a gNodeB base station, a wireless base station, and any combination thereof.

16. The method of claim 15, wherein the base station is operating in at least one of the following communications systems: a long term evolution communications system, a new radio communications system, and any combination thereof.

17. The method of claim 1, wherein the cell site node is a distributed unit (DU).

18. The method of claim 1, wherein the central server is a server of a central management system.

19. An apparatus, comprising:

at least one processor, and at least one non-transitory storage media storing instructions that, when executed by the at least one processor, cause the at least one processor to perform operations comprising:

transmitting a first certificate pre-installed on a cell site node in a wireless communication system from the cell site node to a first server providing verification that the cell site node is authorized to communicate in the wireless communication system, based on the first certificate;

receiving a second certificate at the cell site node from the first server in response to the transmitting the first certificate;

transmitting the second certificate from the cell site node to a central server, distinct from the first server, allowing the cell site node to communicate in the wireless communication system, based on the second certificate; and receiving configuration information at the cell site node from the central server, distinct from the first server, in response to the transmitting the second certificate, the configuration information indicating a configuration for the cell site node for executing communication in the wireless communication system;

wherein the receipt of the configuration information automatically causes the cell site node to configure itself, using the configuration information, for communication in the wireless communication system, and wherein the configuration information comprises at least one of: identity management (IdM) configuration information to allow the cell site node to configure itself as an IdM client and use IdM services in the wireless communication system; and open bootstrap framework (OBF) configuration information to allow the cell site node to configure itself as an OBF client to provide for secure bootstrapping of keys.

20. At least one non-transitory storage media storing instructions that, when executed by at least one processor, cause the at least one processor to perform operations comprising:

transmitting a first certificate pre-installed on a cell site node in a wireless communication system from the cell site node to a first server providing verification that the cell site node is authorized to communicate in the wireless communication system, based on the first certificate;

receiving a second certificate at the cell site node from the first server in response to the transmitting the first certificate;

transmitting the second certificate from the cell site node to a central server, distinct from the first server, allowing the cell site node to communicate in the wireless communication system, based on the second certificate; and receiving configuration information at the cell site node from the central server, distinct from the first server, in response to the transmitting the second certificate, the configuration information indicating a configuration for the cell site node for executing communication in the wireless communication system;

wherein the receipt of the configuration information automatically causes the cell site node to configure itself, using the configuration information, for communication in the wireless communication system, and wherein the configuration information comprises at least one of: identity management (IdM) configuration information to allow the cell site node to configure itself as an IdM client and use IdM services in the wireless communication system; and open bootstrap framework (OBF) configuration information to allow the cell site node to configure itself as an OBF client to provide for secure bootstrapping of keys.

* * * * *